(12) United States Patent
Woo et al.

(10) Patent No.: US 9,874,998 B2
(45) Date of Patent: Jan. 23, 2018

(54) MOBILE TERMINAL AND CONTROLLING METHOD THEREOF

(71) Applicant: LG ELECTRONICS INC., Seoul (KR)

(72) Inventors: Sungmin Woo, Seoul (KR); Sungon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 735 days.

(21) Appl. No.: 14/488,024

(22) Filed: Sep. 16, 2014

(65) Prior Publication Data

US 2015/0205457 A1 Jul. 23, 2015

(30) Foreign Application Priority Data

Jan. 22, 2014 (KR) ........................ 10-2014-0007767

(51) Int. Cl.
*G06F 3/048* (2013.01)
*G06F 3/0482* (2013.01)
*G06F 3/0484* (2013.01)
*G06F 3/0481* (2013.01)

(52) U.S. Cl.
CPC ........ *G06F 3/0482* (2013.01); *G06F 3/04817* (2013.01); *G06F 3/04842* (2013.01); *G06F 2203/04805* (2013.01)

(58) Field of Classification Search
CPC ............... G06F 3/0482; G06F 3/04817; G06F 3/04842; G06F 2203/04805
USPC ....................................................... 715/838
See application file for complete search history.

(56) References Cited

U.S. PATENT DOCUMENTS

| | | | | |
|---|---|---|---|---|
| 7,369,164 B2 * | 5/2008 | Parulski | ............. | G06F 17/3028 348/231.2 |
| 7,443,418 B2 * | 10/2008 | Bryant | .................. | G06Q 40/04 348/207.1 |
| 7,752,573 B2 * | 7/2010 | Shiba | .................. | G06F 3/04817 455/566 |
| 7,823,076 B2 * | 10/2010 | Borovsky | ........... | G06F 3/04883 715/762 |
| 8,151,216 B2 * | 4/2012 | Zhang | ................... | G06F 3/0482 707/999.107 |
| 8,806,376 B2 * | 8/2014 | Park | ................. | H04M 1/72544 715/705 |
| 8,971,623 B2 * | 3/2015 | Gatt | ..................... | G06F 3/0484 382/167 |
| 9,088,719 B2 * | 7/2015 | Yi | ....................... | G06F 3/04883 |
| 9,213,479 B2 * | 12/2015 | Kim | ..................... | G06F 3/0485 |
| 9,454,301 B2 * | 9/2016 | Ka | ....................... | G06F 3/04883 |
| 9,699,351 B2 * | 7/2017 | Fagans | ................. | H04N 1/3875 |
| 2002/0033848 A1 * | 3/2002 | Sciammarella | ....... | G06F 3/0481 715/838 |

(Continued)

*Primary Examiner* — David Phantana Angkool
(74) *Attorney, Agent, or Firm* — Birch, Stewart, Kolasch & Birch, LLP

(57) ABSTRACT

A mobile terminal including a wireless communication unit configured to perform wireless communication; a display unit; a memory configured to store a plurality of images; and a controller configured to receive a command for displaying a focus-based thumbnail list, and display the focus-based thumbnail list to include at least one thumbnail corresponding to an image stored in a memory with focus information, said focus information indicating a focal region focused in the image.

18 Claims, 33 Drawing Sheets

(56) References Cited

U.S. PATENT DOCUMENTS

| | | | |
|---|---|---|---|
| 2005/0091596 A1* | 4/2005 | Anthony | G06F 3/04815 |
| | | | 715/712 |
| 2010/0020221 A1* | 1/2010 | Tupman | G06F 3/04883 |
| | | | 348/333.01 |
| 2010/0083317 A1* | 4/2010 | Inagaki | H04N 5/44591 |
| | | | 725/44 |
| 2010/0333017 A1* | 12/2010 | Ortiz | G06F 3/0483 |
| | | | 715/800 |
| 2013/0215051 A1* | 8/2013 | Kim | G06F 3/0485 |
| | | | 345/173 |
| 2015/0153910 A1* | 6/2015 | Wheeler | G06F 3/0482 |
| | | | 715/719 |
| 2015/0205457 A1* | 7/2015 | Woo | G06F 3/0482 |
| | | | 715/767 |
| 2015/0356715 A1* | 12/2015 | Nakata | G06F 1/1624 |
| | | | 715/719 |
| 2015/0365587 A1* | 12/2015 | Ha | H04N 5/23216 |
| | | | 715/721 |
| 2016/0036966 A1* | 2/2016 | Ka | G06F 3/04883 |
| | | | 455/566 |
| 2016/0274772 A1* | 9/2016 | Yamakawa | G06F 3/04842 |
| 2016/0342846 A1* | 11/2016 | Gordon | G06F 17/3079 |

* cited by examiner

FIG. 6

| 10 | 10 | 10 | 10 | 10 | 10 | 10 | 10 | 10 | 10 |
|----|----|----|----|----|----|----|----|----|----|
| 10 | 10 | 10 | 10 | 10 | 10 | 10 | 10 | 10 | 10 |
| 10 | 10 | 10 | 10 | 3 | 3 | 3 | 3 | 10 | 10 |
| 10 | 10 | 10 | 10 | 3 | 3 | 3 | 3 | 10 | 10 |
| 10 | 10 | 10 | 10 | 3 | 3 | 3 | 3 | 10 | 10 |
| 10 | 10 | 10 | 10 | 3 | 3 | 3 | 3 | 10 | 10 |
| 10 | 10 | 10 | 10 | 3 | 3 | 3 | 3 | 10 | 10 |
| 10 | 10 | 10 | 10 | 3 | 3 | 3 | 3 | 10 | 10 |

FIG. 8
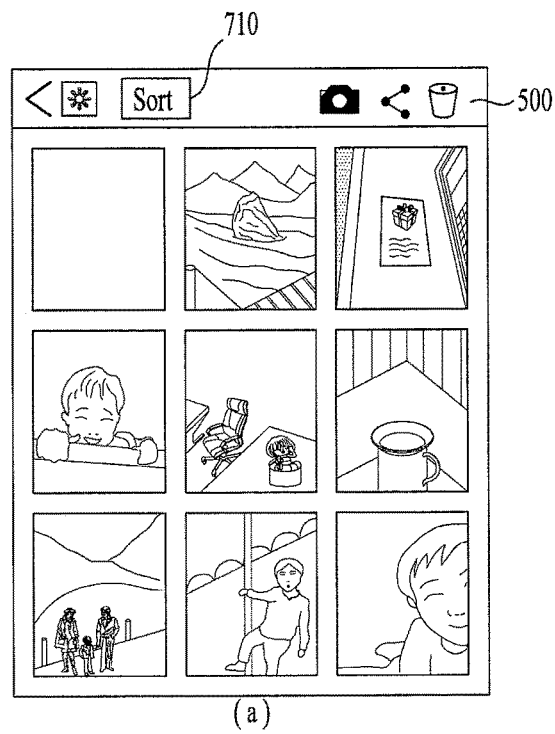
(a)
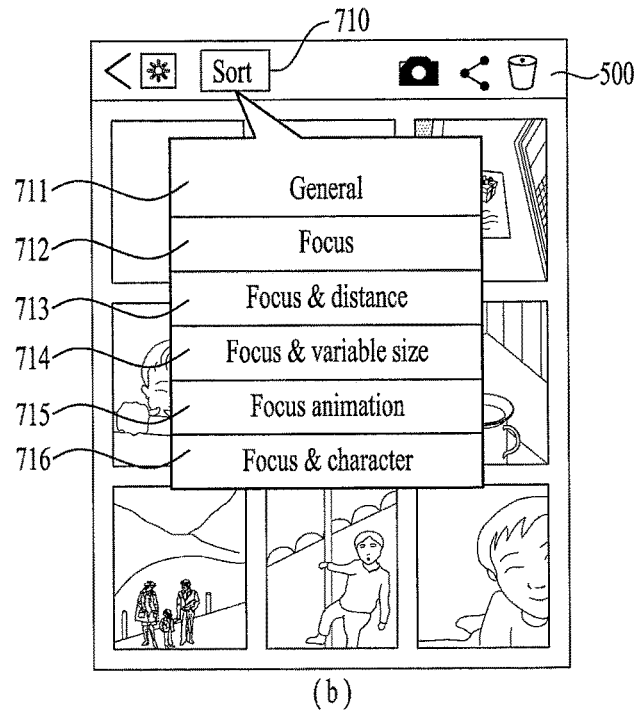
(b)

FIG. 14
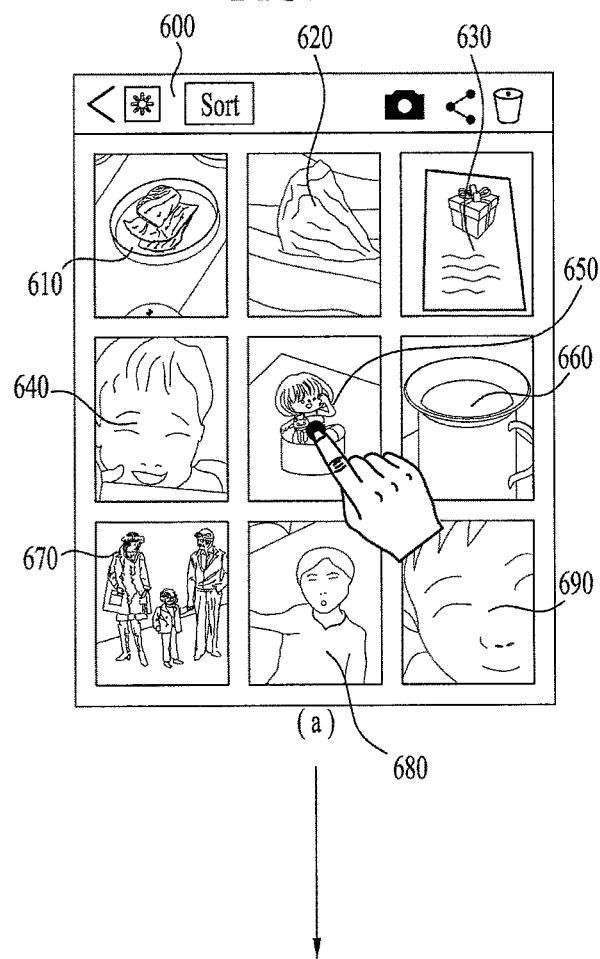
(a)
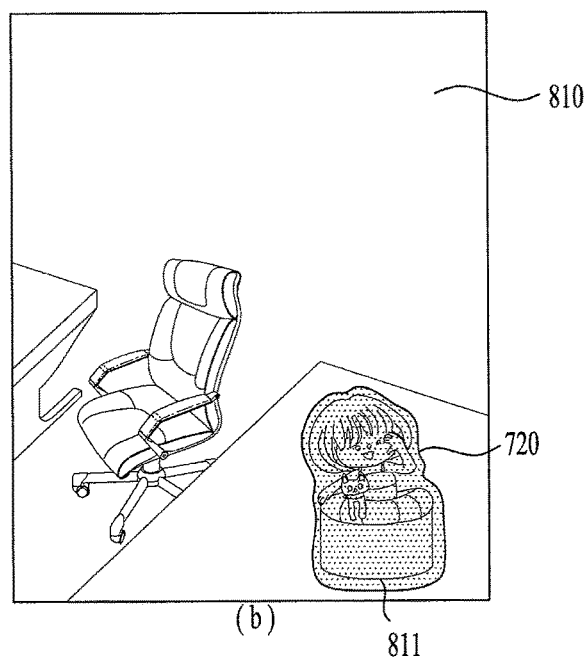
(b)

FIG. 15
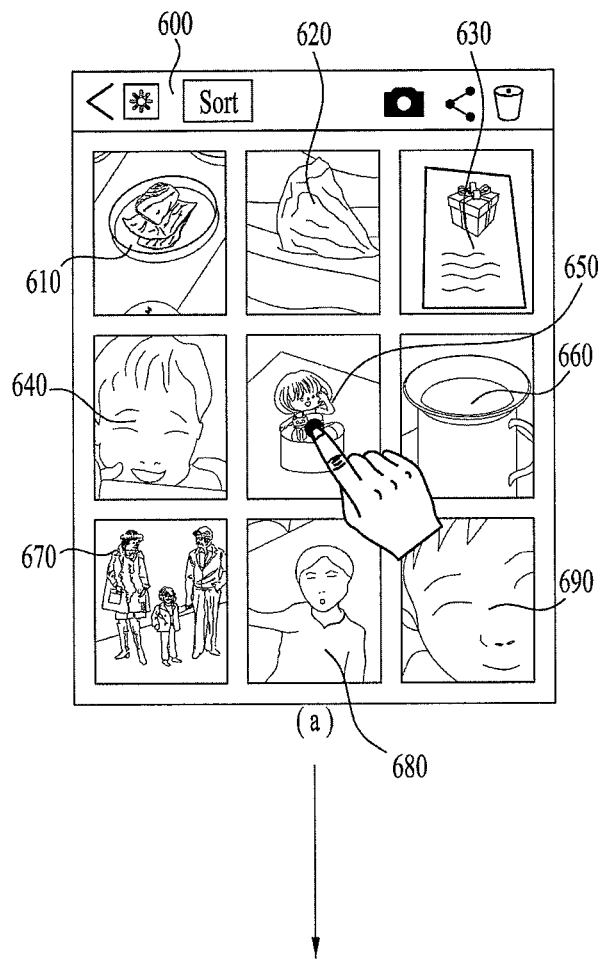
(a)
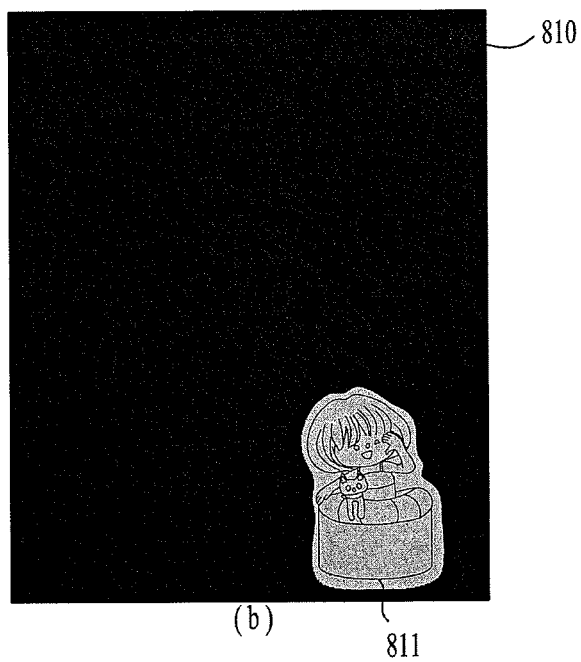
(b)

FIG. 16
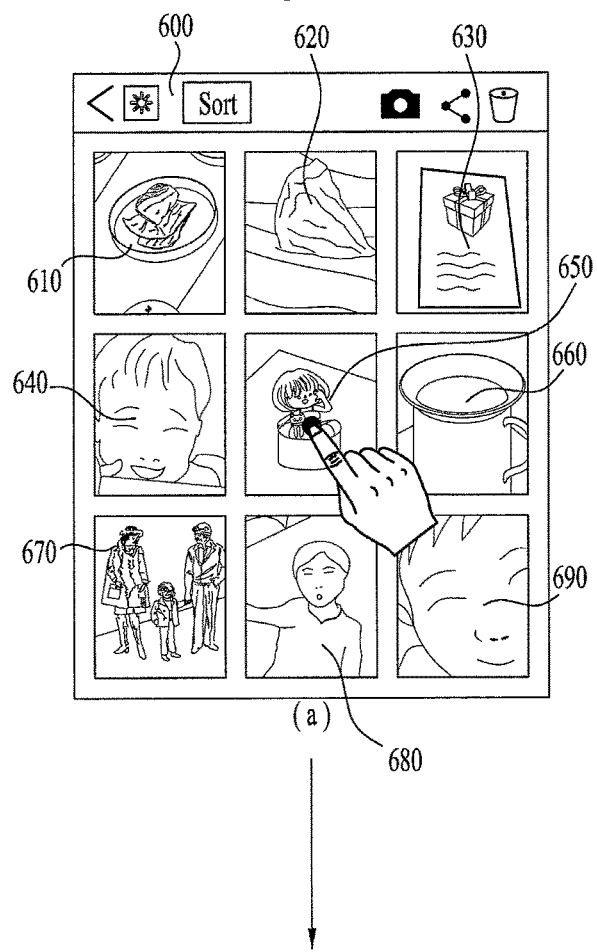
(a)
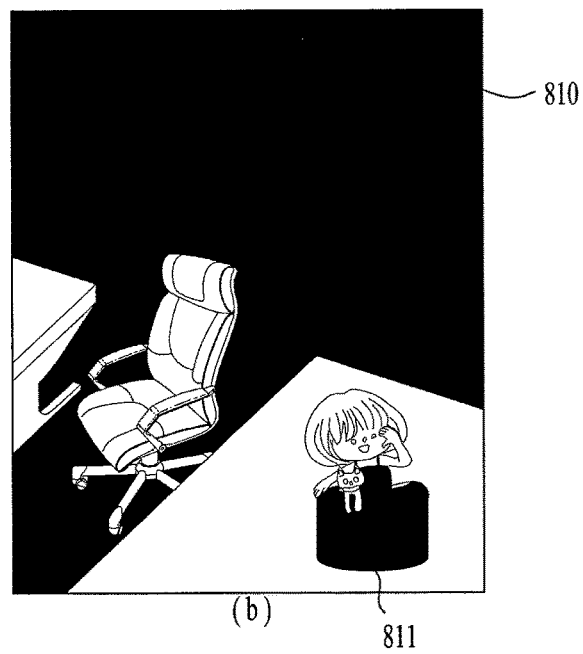
(b)

FIG. 20
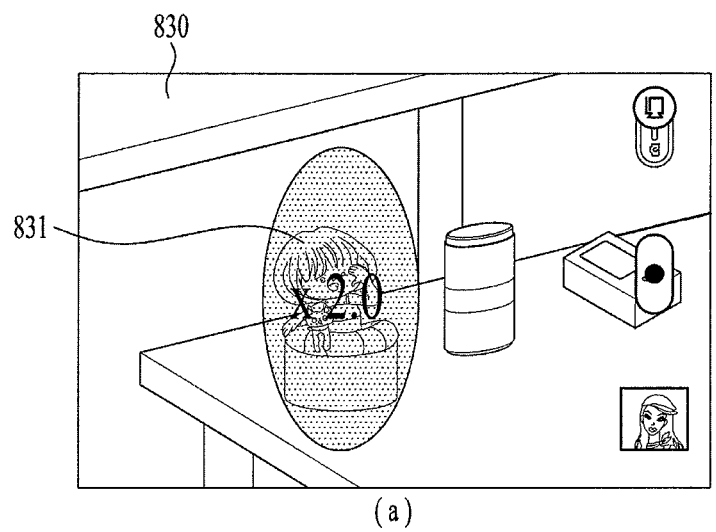
(a)
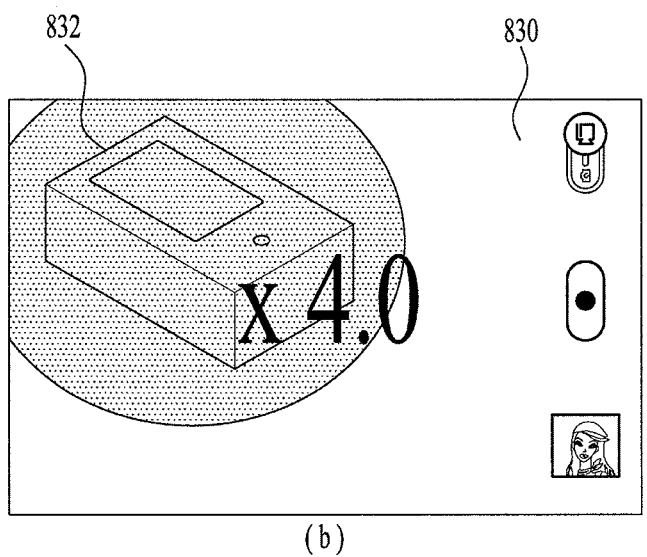
(b)

FIG. 22
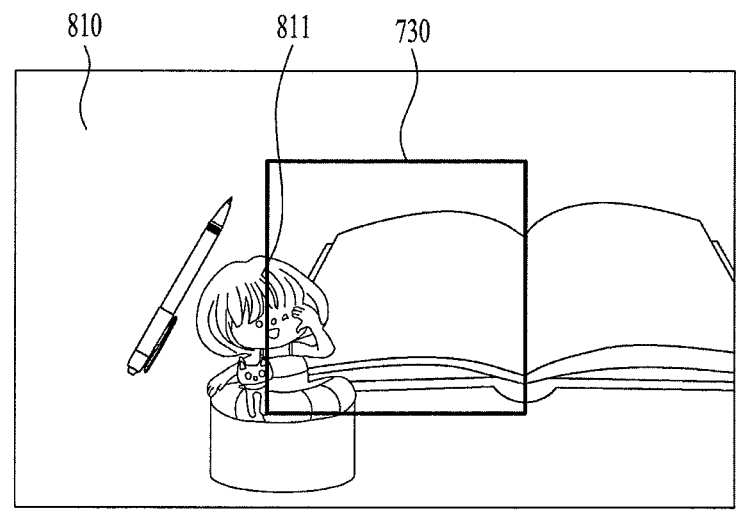
(a)
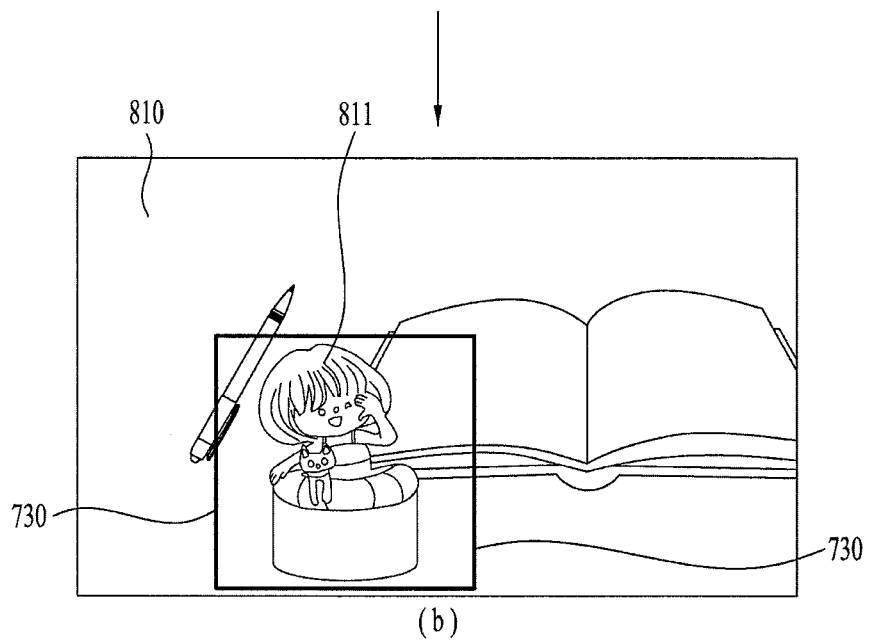
(b)

FIG. 23
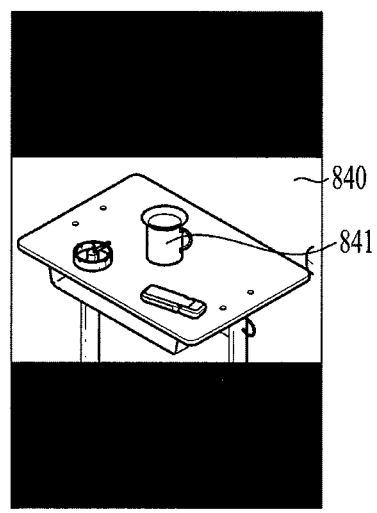 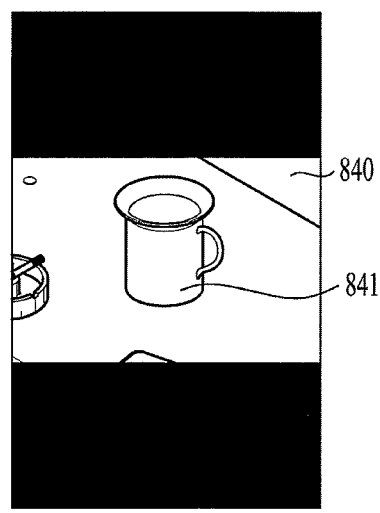
(a)  (b)

FIG. 26
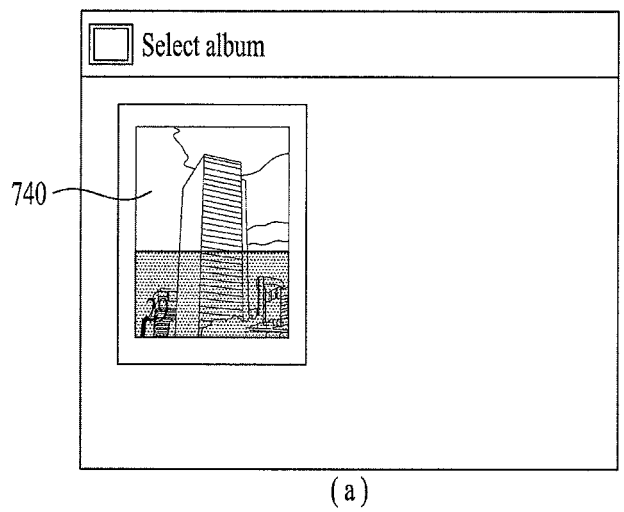
(a)
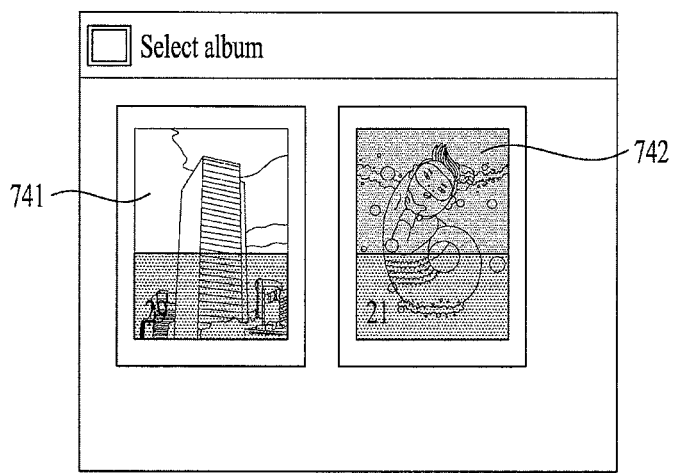
(b)

FIG. 28
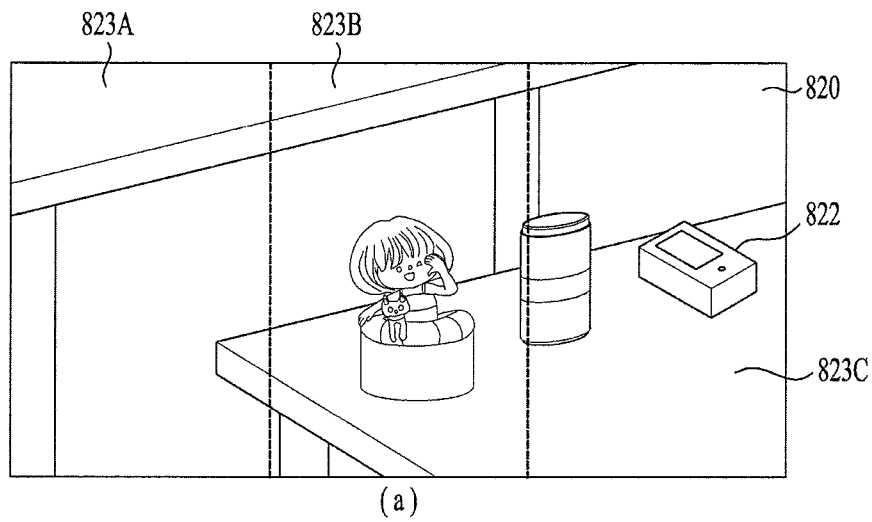
(a)
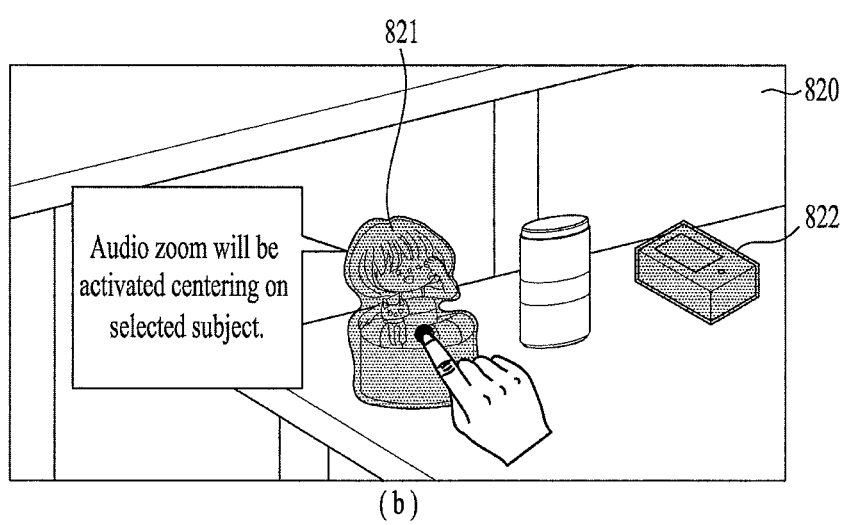
(b)

FIG. 29
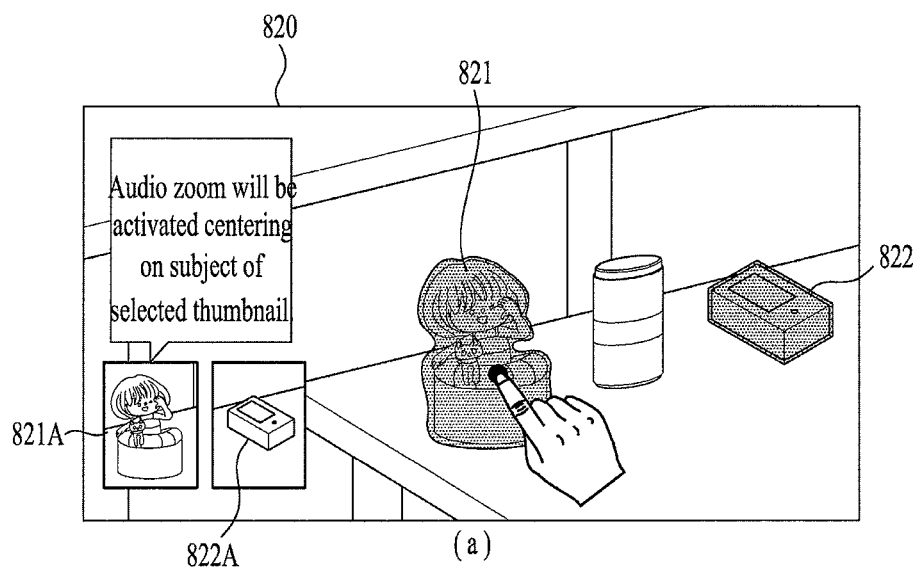
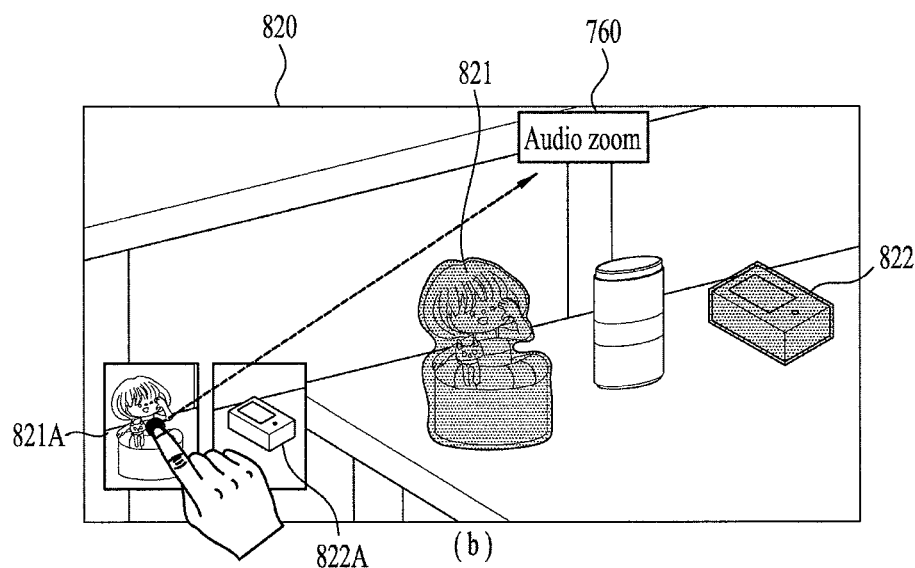

FIG. 30
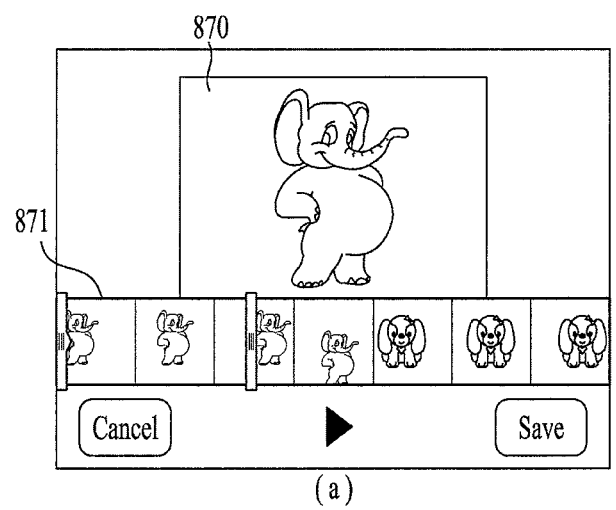
(a)
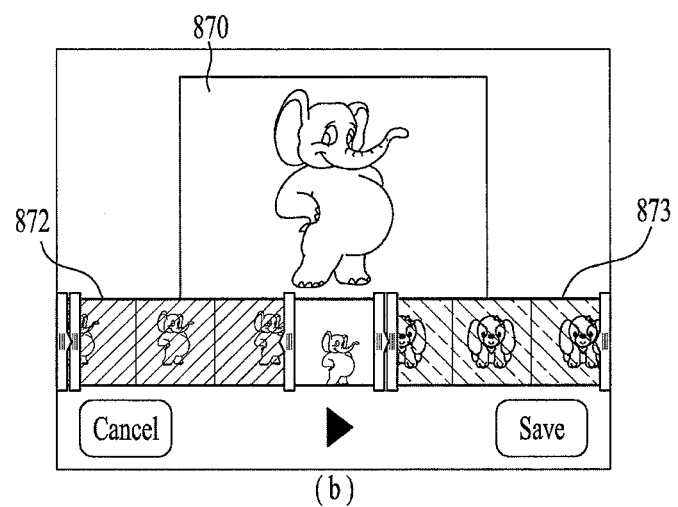
(b)

FIG. 31
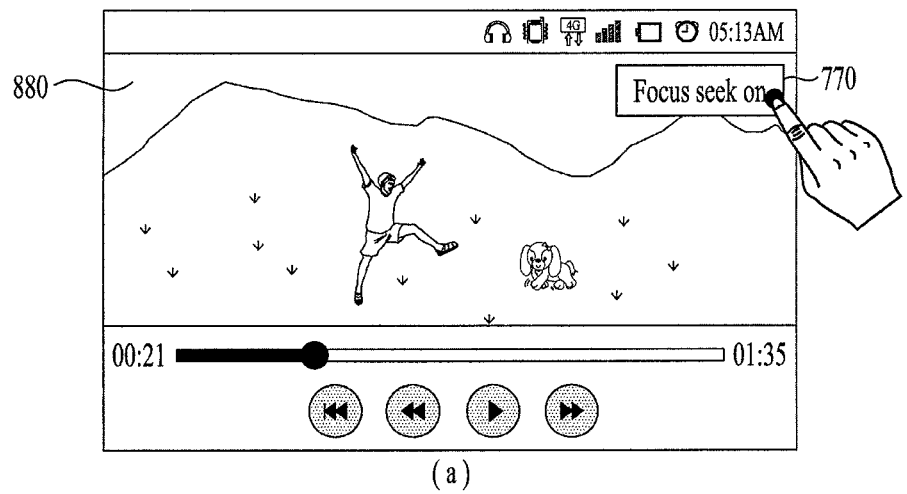
(a)
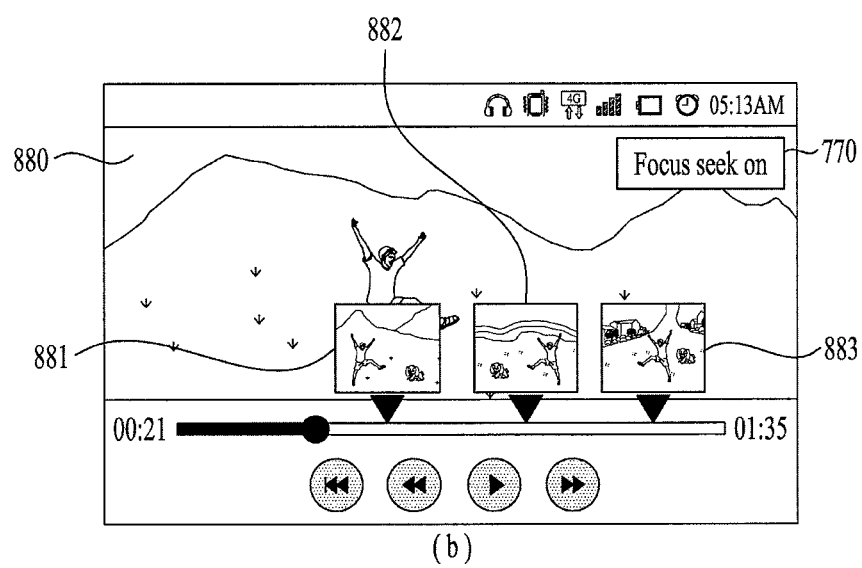
(b)

FIG. 32
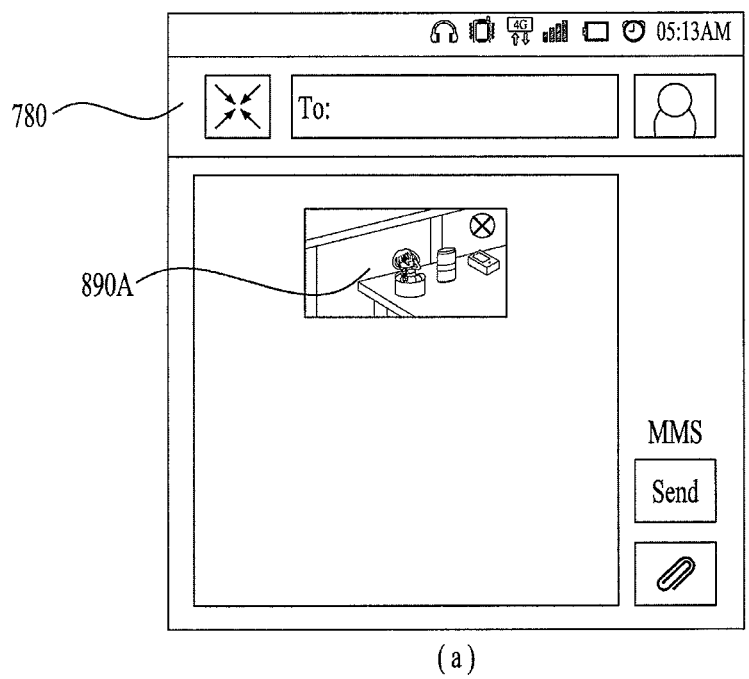
(a)
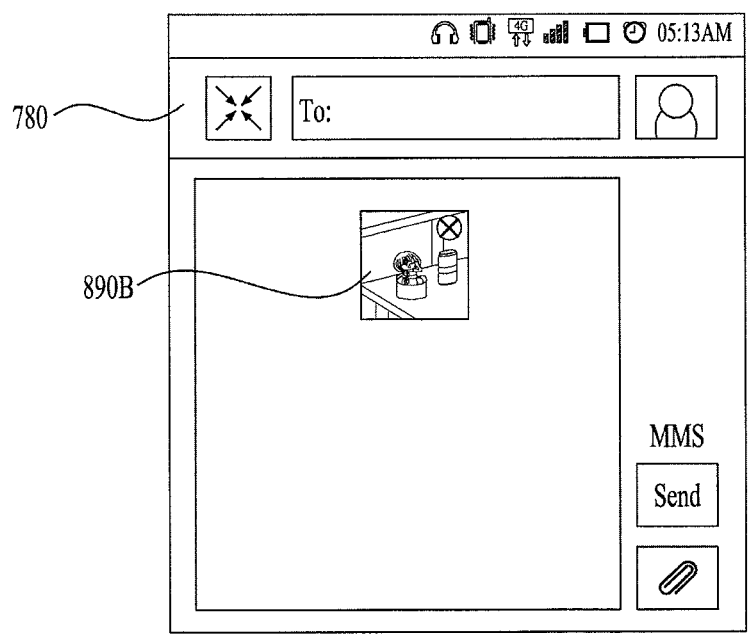
(b)

FIG. 33
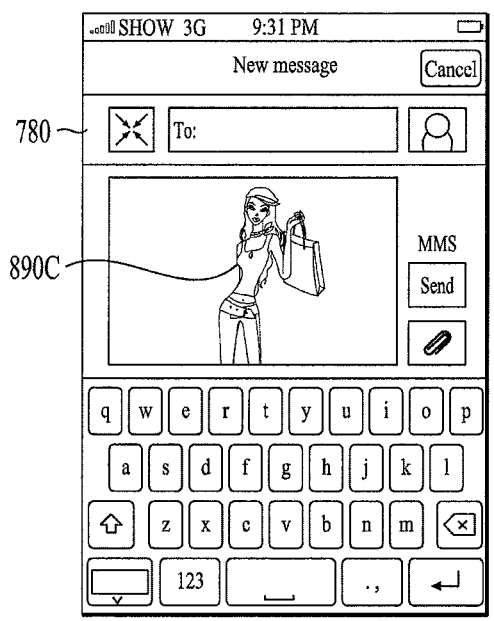
(a)
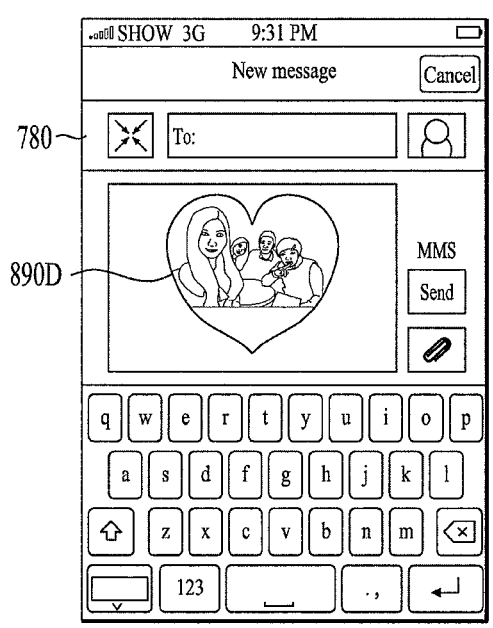
(b)

MOBILE TERMINAL AND CONTROLLING METHOD THEREOF

Pursuant to 35 U.S.C. §119(a), this application claims the benefit of earlier filing date and right of priority to Korean Application No. 10-2014-0007767, filed on Jan. 22, 2014, the contents of which are hereby incorporated by reference herein in their entirety.

BACKGROUND OF THE INVENTION

Field of the Invention

The present invention relates to a mobile terminal, and more particularly, to a mobile terminal and a method of controlling the mobile terminal.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, as performance of a camera provided to a terminal has been developed into a digital camera level, the camera of the terminal can support a multi-focus function. In particular, if a terminal is focused on at least one subject (i.e., a focal region) in a preview image input through a camera, the terminal displays a box on a focused part so that a user can recognize a currently focused part in the preview image.

However, a multi-focusing function is currently provided only to provide a better image photographing environment before capturing an image. After an image has been taken and saved, a function of displaying the image in various ways using focus information on the image is not provided yet. Moreover, after an image has been taken and saved through a camera of a terminal, when a thumbnail list for the image is displayed, a thumbnail for the image represents whole part of the image but is unable to selectively represent a focused part in the image on the basis of focus information of the image.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a thumbnail list of images having focus information among saved images can be provided on displaying the thumbnail list for the saved images.

Another object of the present invention is to provide a mobile terminal and controlling method thereof, by which a thumbnail represented centering on a focal region in an image can be provided based on focus information.

Further object of the present invention is to provide a mobile terminal and controlling method thereof, by which various editing functions can be provided to an image corresponding to a thumbnail by utilizing focus information on the image on displaying a viewer screen of the image.

Technical tasks obtainable from the present invention are non-limited by the above-mentioned technical tasks. In addition, other unmentioned technical tasks can be clearly understood from the following description by those having ordinary skill in the technical field to which the present invention pertains.

Additional advantages, objects, and features of the invention will be set forth in the invention herein as well as the accompanying drawings. Such aspects may also be appreciated by those skilled in the art based on the invention herein.

To achieve these objects and other advantages and in accordance with the purpose of the invention, as embodied and broadly described herein, a mobile terminal according to an embodiment of the present invention may include a display unit, a memory configured to store a plurality of images and focal information on at least one of the images, and a controller configured to search the memory for at least one image having the focal information among the images when a command for displaying a focus-based thumbnail list is input, and to control the display unit to display the thumbnail list including at least one thumbnail indicating the searched image.

In another aspect of the present invention, a method of controlling a mobile terminal according to an embodiment of the present invention may include the steps of storing a plurality of images and focal information on at least one of the images, searching for at least one image having the focal information among the images when a command for displaying a focus-based thumbnail list is input, and displaying the thumbnail list including at least one thumbnail indicating the searched image.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 6 is a diagram illustrating a process for autofocusing on a subject in an image according to an embodiment of the present invention;

FIGS. 8 to 33 are diagrams of display screen configurations to implement a method of controlling a mobile terminal according to an embodiment of the present invention.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
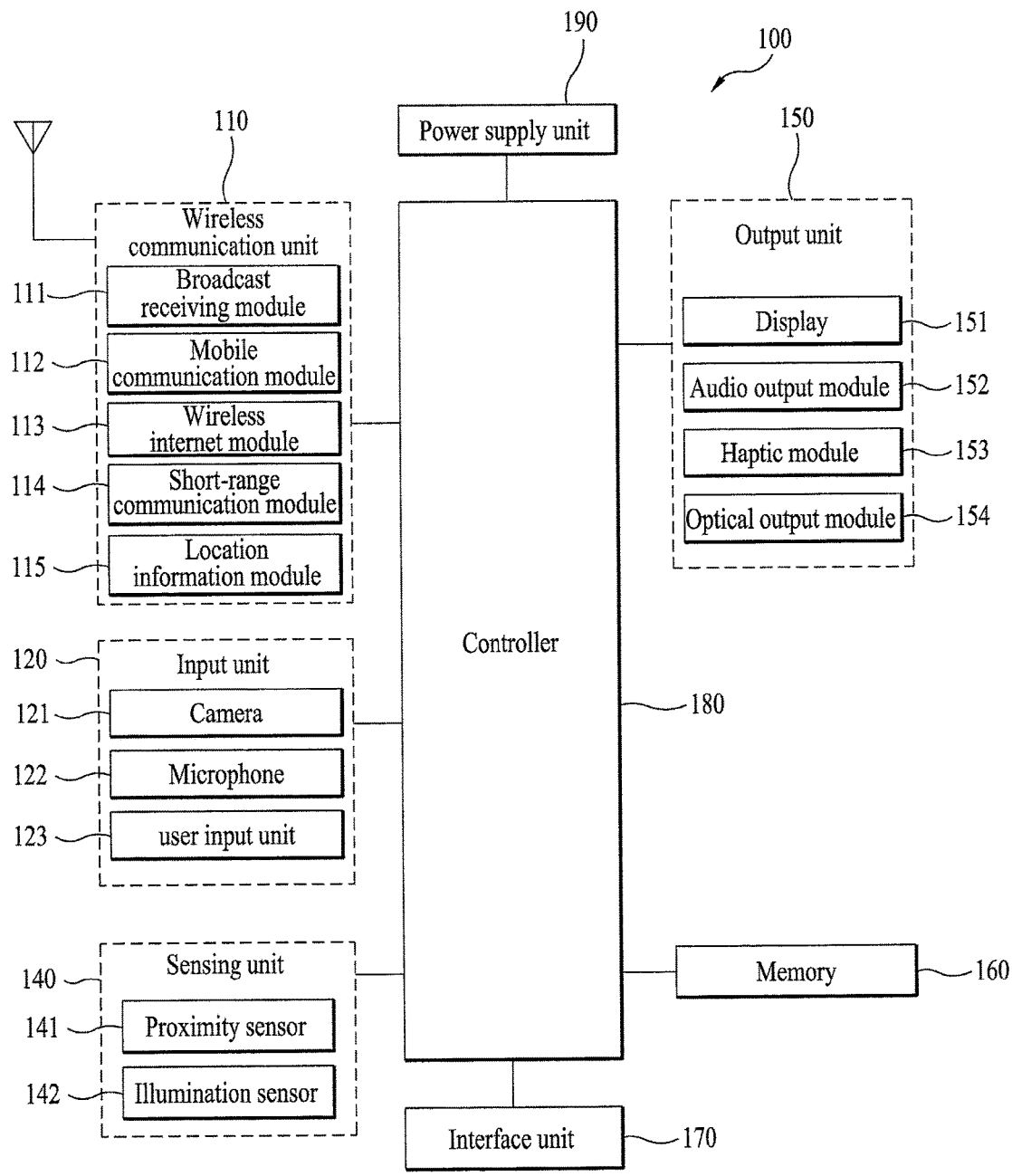
FIG. 1A is a block diagram of a mobile terminal in accordance with the present invention.
Figure 1B:
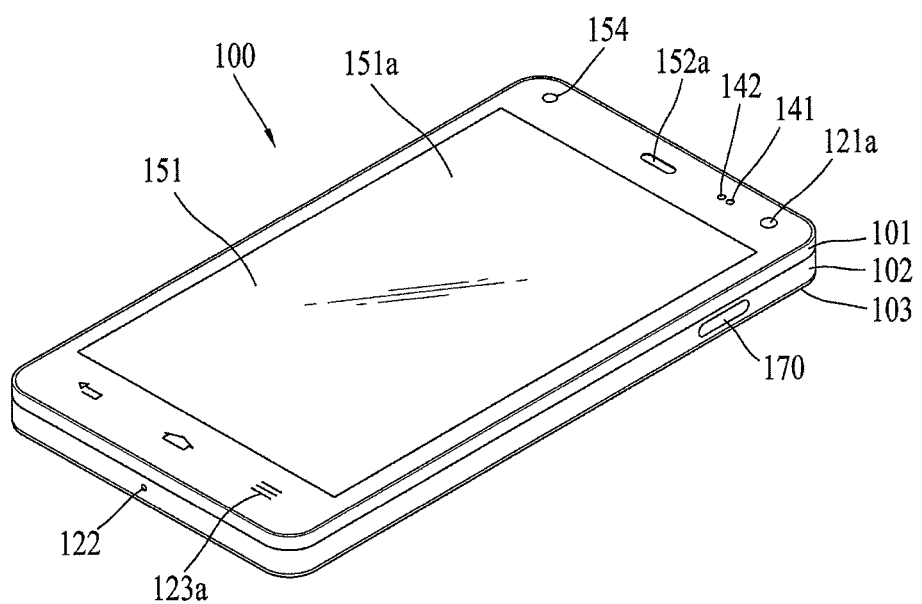
FIGS. 1B and 1C are conceptual views of one example of the mobile terminal, viewed from different directions.
Figure 1C:
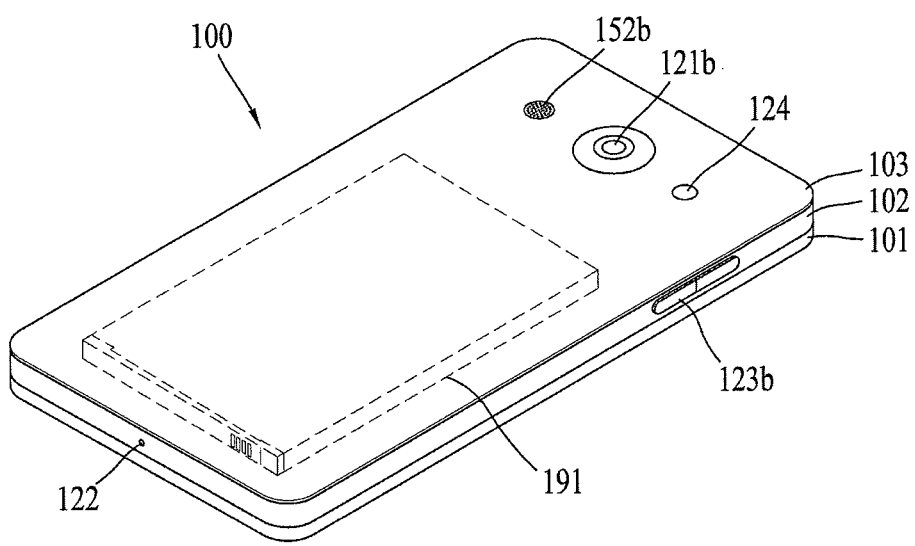

Reference is now made to FIGS. 1A-1C, where FIG. 1A is a block diagram of a mobile terminal in accordance with one embodiment of the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, a memory 160, an interface unit 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display 151, an audio output module 152, a haptic module 153, and an optical output module 154.

The display 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 170 serves as an interface with various types of external devices that can be coupled to the mobile terminal 100. The interface unit 170, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 170.

The memory 160 is typically implemented to store data to support various functions or features of the mobile terminal 100. For instance, the memory 160 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 160, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 160.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display 151 or stored in memory 160. In some instances, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input enables the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

In some embodiments, the display 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 160. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 170 serves as an interface for external devices to be connected with the mobile terminal 100. For example, the interface unit 170 can receive data transmitted from an external device, receive power to transfer to elements and components within the mobile terminal 100, or transmit internal data of the mobile terminal 100 to such external device. The interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 170.

When the mobile terminal 100 is connected with an external cradle, the interface unit 170 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 160 can store programs to support operations of the controller 180 and store input/output data (for example, phonebook, messages, still images, videos, etc.). The memory 160 may store data related to various patterns of vibrations and audio which are output in response to touch inputs on the touch screen.

The memory 160 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 160 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 170 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant invention. Some components may be omitted or rearranged. For example, the first manipulation unit 123a may be located on another surface of the terminal body, and the second audio output module 152b may be located on the side surface of the terminal body.

The display 151 outputs information processed in the mobile terminal 100. The display 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display 151 may be implemented using two display devices, which can implement the same or different display technology. For instance, a plurality of the display units 151 may be arranged on one side, either spaced apart from each other, or these devices may be integrated, or these devices may be arranged on different surfaces.

The display 151 may also include a touch sensor which senses a touch input received at the display unit. When a touch is input to the display 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display 151 or stored in the memory 160.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display 151, and the like. The rear input unit may be configured to permit touch input, a push input, or combinations thereof.

The rear input unit may be located to overlap the display 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 170 may serve as a path allowing the mobile terminal 100 to interface with external devices. For example, the interface unit 170 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 170 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. Also, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 170. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display 151 to extend the function of the mobile terminal 100. Another example of the accessory is a touch pen for assisting or extending a touch input to a touch screen.

Figure 2:
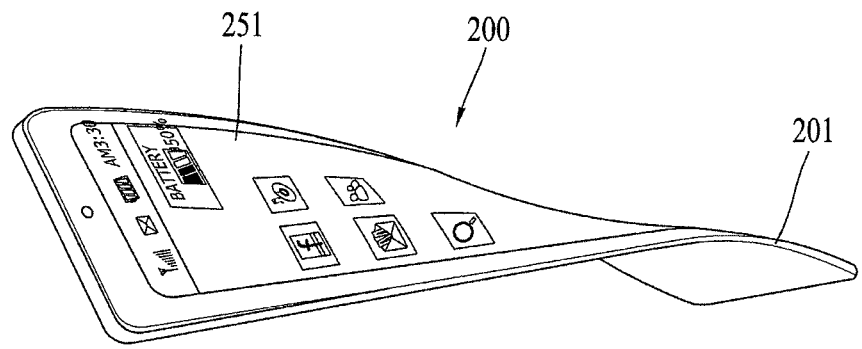
FIG. 2 is a conceptual view of a deformable mobile terminal according to an alternative embodiment of the present invention.

Next, FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140. The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251. A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like. In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
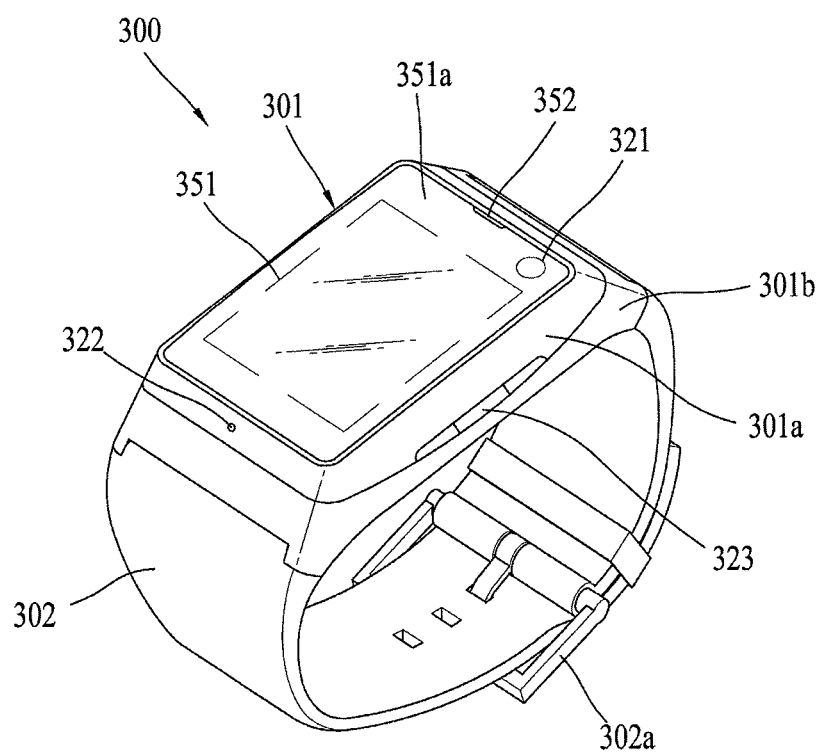
FIG. 3 is a conceptual view of a wearable mobile terminal according to another alternative embodiment of the present invention.

FIG. 3 is a perspective view illustrating one example of a watch-type mobile terminal 300 in accordance with another embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
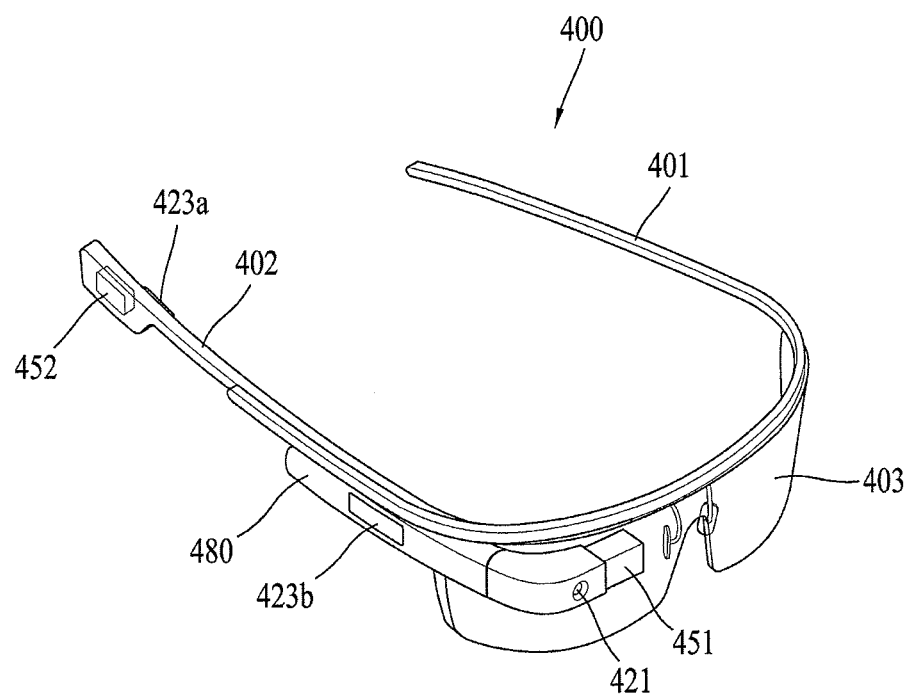
FIG. 4 is a perspective view illustrating one example of a glass-type mobile terminal.

FIG. 4 is a perspective view illustrating one example of a glass-type mobile terminal 400 according to another embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user. In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423*a* and 423*b*, which can each be manipulated by the user to provide an input. The user input units 423*a* and 423*b* may employ techniques which permit input via a tactile input. Typical tactile inputs include a touch, push, or the like. The user input units 423*a* and 423*b* are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

In the following description, embodiments related to a controlling method implemented in the above-configured mobile terminal are explained with reference to the accompanying drawings. With reference to FIGS. 5 to 33, a process for providing focus information based thumbnail list and focus information based thumbnail is described in detail as follows.

Figure 5:
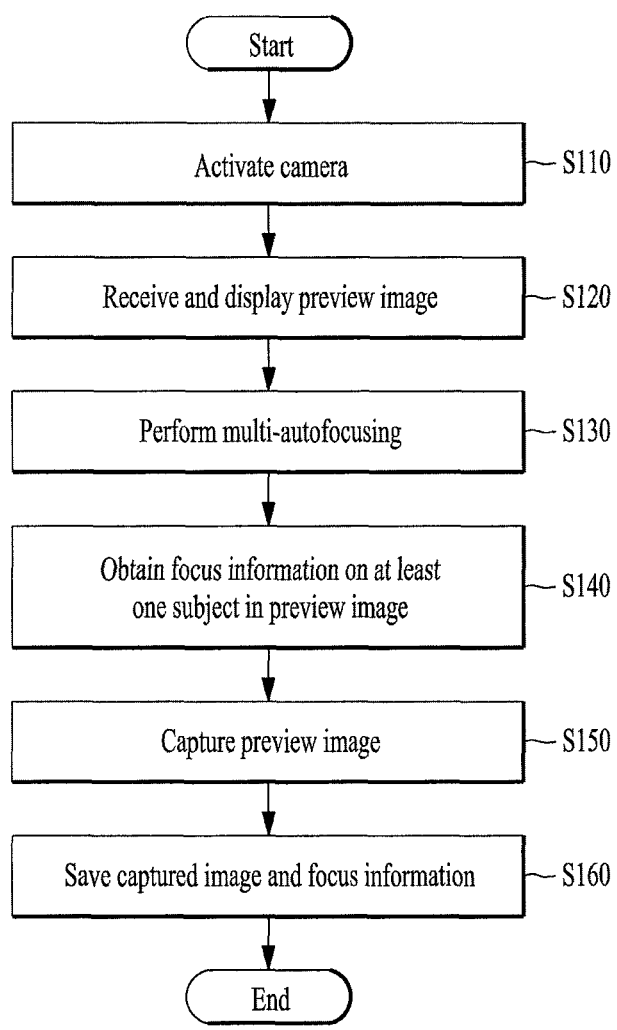
FIG. 5 is a flowchart illustrating a method of creating an image having focus information according to an embodiment of the present invention.

FIG. 5 is a flowchart illustrating a method of creating an image having focus information according to an embodiment of the present invention, and FIG. 6 is a diagram illustrating a process for autofocusing on a subject in an image according to an embodiment of the present invention.

Referring to FIG. 5 and FIG. 6, if a camera function is selected through the touchscreen 151 or the user input unit 123, the controller 180 of the mobile terminal 100 activates the camera 121 (S110) and then displays a preview image received through the camera 121 on the touchscreen 151 (S120). In this instance, the camera 121 of the present invention supports a multi-autofocus function for at least one or more subjects (or parts) included in the preview image.

In particular, if a command for enabling a multi-autofocus is input by a user in a camera photographing mode, the controller 180 controls the camera 121 to focus on the at least one or more subjects included in a current preview image (S130). The controller 180 acquires focus information on the at least one or more subjects included in the current preview image through the camera 121 (S140).

If a command for capturing a preview image is input, the controller 180 captures a preview image at a timing point of inputting the capture command (S150) and then saves the captured image and the focus information in the memory 160 by mapping the captured image and the focus information to each other (S160). In this instance, the focus information can include at least one of a location and size of a focal region focused on in the image, a focal distance, a depth, a distance to the focal region, and a position of a camera lens for the focal region.

Referring to FIG. 6, the camera 121 partitions a preview image into a multitude of regions and sequentially moves a lens provided to the camera 121 in a focal distance range in which the lens is movable. Each time the lens is moved, the camera 121 obtains a contrast value of each of the regions. In addition, the camera 121 recognizes a value, which is closest or equal to a preset reference value among the contrast values of the regions, as an autofocused lens position value.

Based on the autofocused lens position value of each of the regions, the camera 121 recognizes an autofocused subject in the preview image and can analyze a location of a focal region for the subject, a size of the focal region, a focal distance, a depth and a distance to the subject, as focus information of the subject. Meanwhile, the controller 180 enters the focus information on the captured image in a meta information of the captured image and can then save it in the memory 160.

The controller 180 saves a video, which is recorded during a specific time through the camera 121, in the memory 160. While the video is recorded, the controller 180 can save the video in the memory 160 by mapping focus information of at least one subject, which is included in each scene of the video in recording the video, to the corresponding scene.

With reference to FIGS. 7 to 33, a process for providing focus information based thumbnail list and focus information based thumbnail is described in detail as follows. In particular, FIG. 7 is a flowchart illustrating a method of controlling a mobile terminal according to one embodiment of the present invention, and FIGS. 8 to 33 are diagrams of display screen configurations to implement a method of controlling a mobile terminal according to an embodiment of the present invention.

Figure 7:
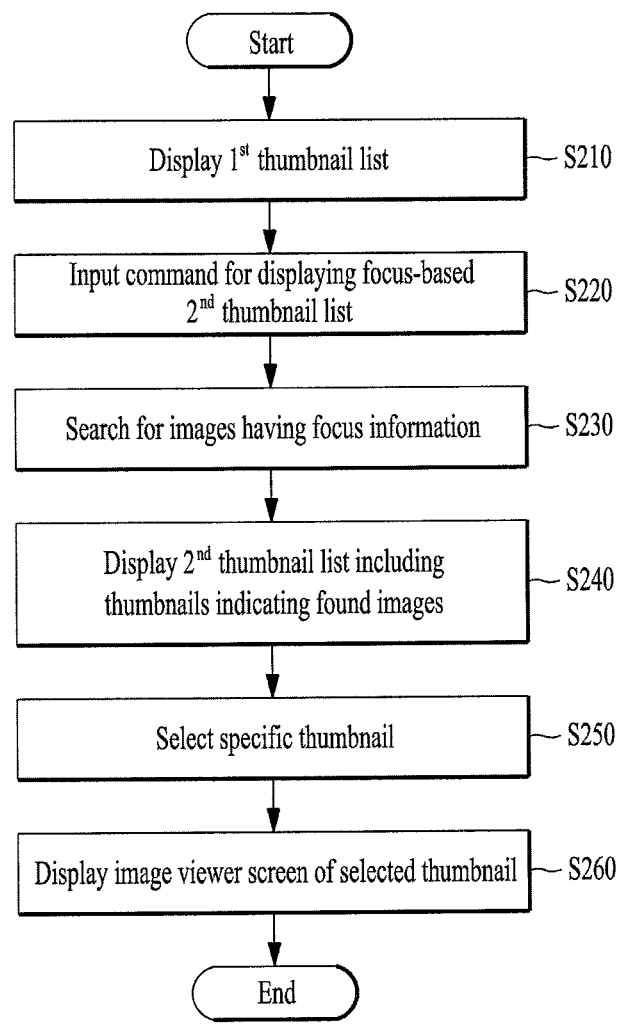
FIG. 7 is a flowchart illustrating a method of controlling a mobile terminal according to one embodiment of the present invention.

Referring to FIG. 7, if an image viewer function is selected through the touchscreen 151 or the user input unit 123, the controller 180 activates the image viewer function and displays a first thumbnail list containing thumbnails indicating images saved in the memory 160 on an active screen of the activated image viewer function (S210). In this instance, the image viewer function includes such an image viewer application installed on the mobile terminal 100 as a gallery application and the like.

In particular, each of the thumbnails displayed in the first thumbnail list has an icon shape in size smaller than that of an original copy of a corresponding image and the thumbnails represents all of the corresponding images in form of a preview. Each of the images represented by the thumbnails may include at least one of a moving image taken through the camera 121 and a still image taken through the camera.

After the first thumbnail list has been displayed, if a user inputs a display command for displaying a focus-based second thumbnail list (S220), the controller 180 searches the images saved in the memory 160 for the images having the focus information mentioned in the foregoing description with reference to FIG. 5 (S230).

If a preset touch gesture is input to a screen having the first thumbnail list displayed thereon, the controller 180 can recognize the input touch gesture as a display command for displaying the second thumbnail list. For instance, the preset touch gesture may include a pinch-in/out touch gesture input to the first thumbnail list displayed screen. In another instance, the preset touch gesture may include a drag touch gesture input to the first thumbnail list displayed screen by being dragged in a specific direction or a flick touch gesture input to the first thumbnail list displayed screen by being flicked in a specific direction.

The controller 180 displays the second thumbnail list, which contains the thumbnails indicating the images found in the step S230, on the touchscreen 151 (S240). Thus, when a thumbnail indicating an image having the focus information is created, the controller 180 creates the thumbnail centering on a focal region focused on in the image based on the focus information of the image and then displays the created thumbnail on the second thumbnail list.

In particular, the controller 180 creates the thumbnail in a manner that the focal region focused on in the second thumbnail list is displayed at the center of the thumbnail. Thereafter, if a specific thumbnail is selected from the second thumbnail list (S250), the controller 180 displays an image viewer screen on which a whole original copy of the image corresponding to the selected thumbnail is displayed (S260).

With reference to FIGS. 8 to 13, the second thumbnail list mentioned in the above description with reference to FIG. 7 is described in detail as follows. First of all, referring to FIG. 8, while the first thumbnail list 500 mentioned in the above description with reference to FIG. 7 is displayed, if a sorting menu 710 for changing the first thumbnail list 500 into a focus based second thumbnail list 600 and then displaying the second thumbnail list 600 is selected (FIG. 8 (*a*)), the controller 180 displays a sorting option list containing at least two sorting options 711 to 716 belonging to the selected sorting menu 710 (FIG. 8 (*b*)).

In this instance, the first sorting option 711 included in the sorting option list is the sorting option for changing the first thumbnail list 500 into the focus based second thumbnail list 600 and then changing the second thumbnail list 600 into the first thumbnail list 500. In particular, after the first thumbnail list 500 has been changed into the focus based second thumbnail list 600, if the first sorting option 711 is selected, the controller 180 changes the second thumbnail list 600 into the first thumbnail list 500 and then displays the first thumbnail list 500.

Figure 9:
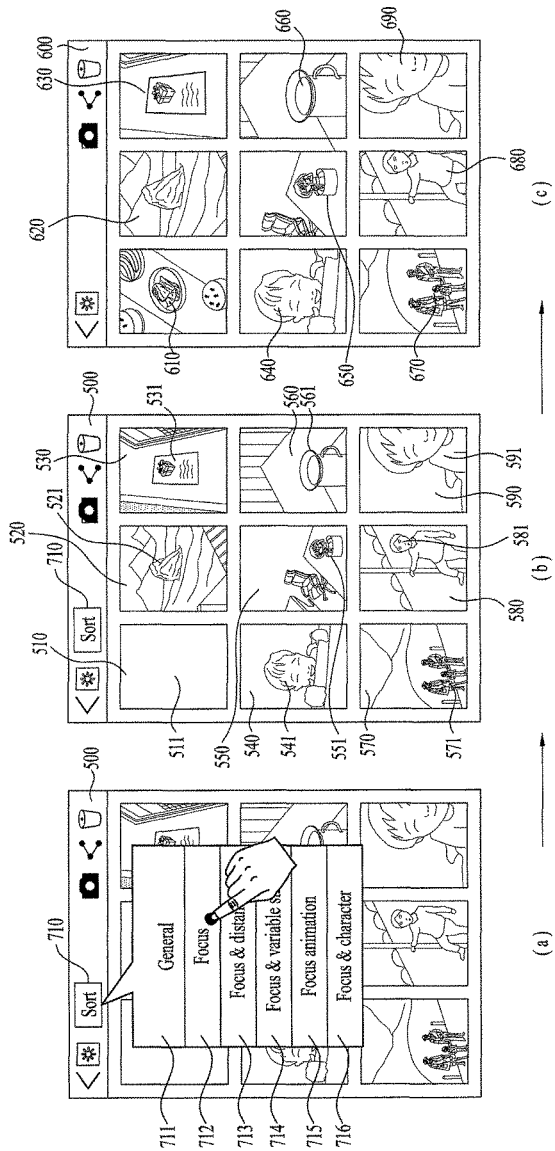

Referring to FIG. 9, if the second sorting option 712 is selected from the sorting option list (FIG. 9 (*a*)), the controller 180 creates corresponding thumbnails centering on focal regions focused on in images having focal information among a multitude of thumbnails 510, 520, 530, 540, 540, 550, 560, 570, 580 and 590 shown in FIG. 9 (*b*) (FIG. 9 (*c*)) and then displays the second thumbnail list 600 containing the created thumbnails.

For instance, the thumbnails 510, 520, 530, 540, 540, 550, 560, 570, 580 and 590 containing the focal regions 511, 521, 531, 541, 551, 561, 571, 581 and 591 focused on in the first thumbnail list 500 are displayed as the thumbnails 610, 620, 630, 640, 650, 660, 670, 680 and 690 created centering on the focal regions 511, 521, 531, 541, 551, 561, 571, 581 and 591 in the focus based second thumbnail list 600 by being changed into the thumbnails 610, 620, 630, 640, 650, 660, 670, 680 and 690.

Figure 10:
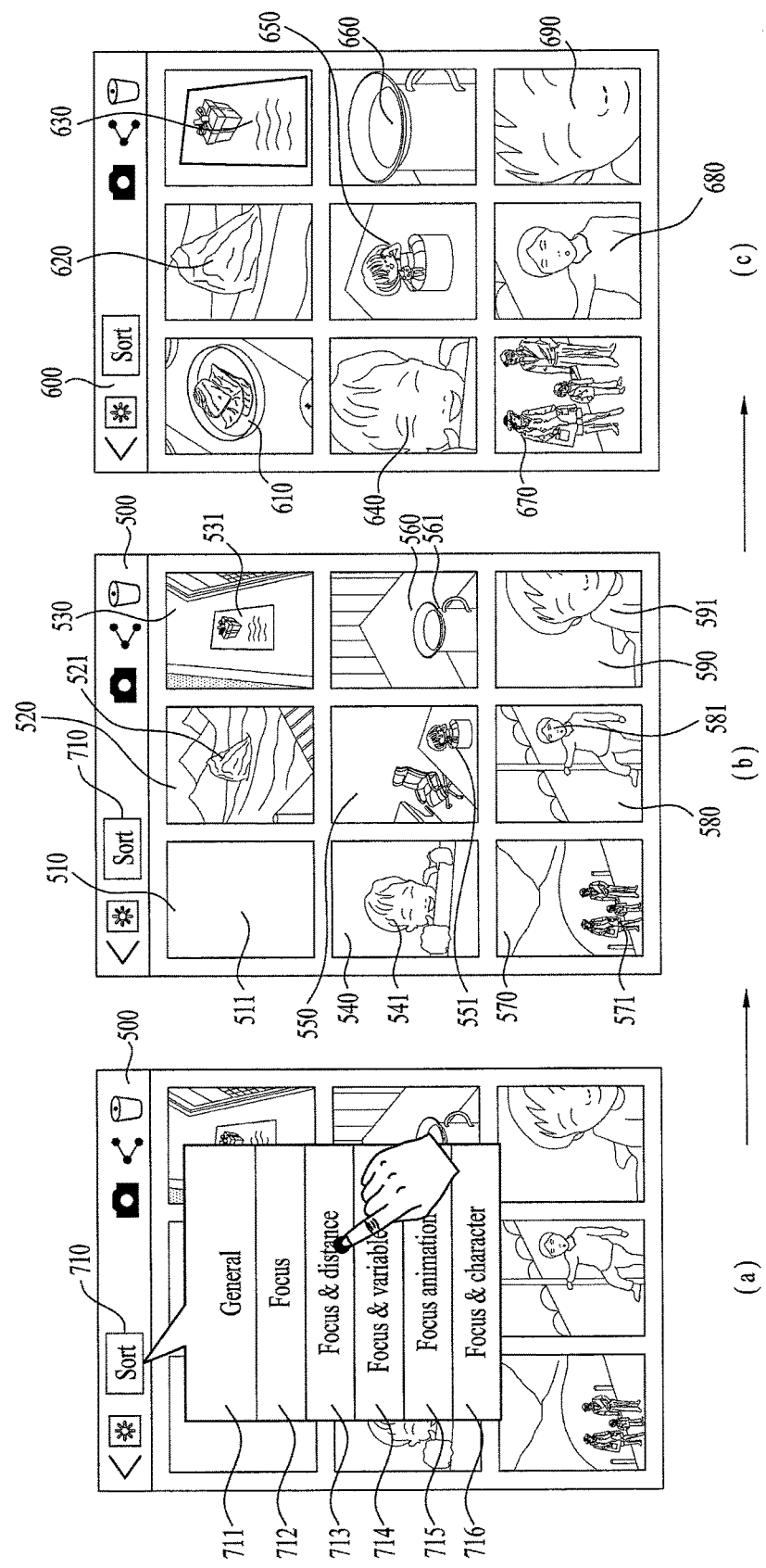

Referring to FIG. 10, if the third sorting option 713 is selected from the sorting option list (FIG. 10 (*a*)), the controller 180 creates the corresponding thumbnails 610, 620, 630, 640, 650, 660, 670, 680 and 690 centering on the focal regions 511, 521, 531, 541, 551, 561, 571, 581 and 591 focused on in the images having the focus information among a multitude of the thumbnails 510, 520, 530, 540, 540, 550, 560, 570, 580 and 590 shown in FIG. 10 (*b*) (FIG. 10 (*c*)). In particular, the controller 180 creates the thumbnails 610, 620, 630, 640, 650, 660, 670, 680 and 690, to which the zoom magnifications of the focal regions 511, 521, 531, 541, 551, 561, 571, 581 and 591 are differently applied, in accordance with one of the distances (e.g., subject distances) to the focal regions 511, 521, 531, 541, 551, 561, 571, 581 and 591 and the focal distances for the focal regions 511, 521, 531, 541, 551, 561, 571, 581 and 591 and then displays a second thumbnail list 600 containing the created thumbnails 610, 620, 630, 640, 650, 660, 670, 680 and 690.

Thus, the controller 180 can differentiate the zoom magnifications if the focal regions 511, 521, 531, 541, 551, 561, 571, 581 and 591 become too small to be identifiable within the corresponding thumbnails 610, 620, 630, 640, 650, 660, 670, 680 and 690 with the naked eye, respectively. Further, the controller 180 can differentiate the zoom magnifications in a full display available range within the corresponding thumbnails 610, 620, 630, 640, 650, 660, 670, 680 and 690 if the focal regions 511, 521, 531, 541, 551, 561, 571, 581 and 591 become too large to be displayed within the corresponding thumbnails 610, 620, 630, 640, 650, 660, 670, 680 and 690, respectively.

In particular, if a distance from the camera 121 to a focal region in an image increases, the controller 180 creates a corresponding thumbnail by increasing a zoom-in magnification of the focal region in order for the focal region to be viewed clearly within the corresponding thumbnail. Further, if a distance from the camera 121 to a focal region in an image decreases, the controller 180 creates a corresponding thumbnail by decreasing a zoom-in magnification of the focal region.

For instance, since a distance to a focal region 521 in a 2A thumbnail 520 of the first thumbnail list 500 is farther than a focal region 561 of a 6A thumbnail 560, an increased zoom-in magnification of the focal region 521 of the 2A thumbnail 520 is applied in a 2B thumbnail 620 within the focus based second thumbnail list 600 and a decreased zoom-in magnification of the focal region 561 of the 6A thumbnail 560 is applied in a 6B thumbnail 660.

If a focal distance of each of the focal regions 511, 521, 531, 541, 551, 561, 571, 581 and 591 decreases, an angle of view is widened. Hence, a corresponding focal region is viewed farther. If the focal distance increases, an angle of view is narrowed. Hence, the corresponding focal region is viewed closer.

Therefore, based on a corresponding focus information, if a focal distance of a focal region in an image from the camera 121 decreases, the controller 180 creates a corresponding thumbnail by applying an increased zoom-in magnification of the focal region in order for the focal region to be viewed clear in the corresponding thumbnail. Further, if a focal distance of a focal region in an image from the camera 121 increases, the controller 180 creates a corresponding thumbnail by applying a decreased zoom-in magnification of the focal region.

Figure 11:
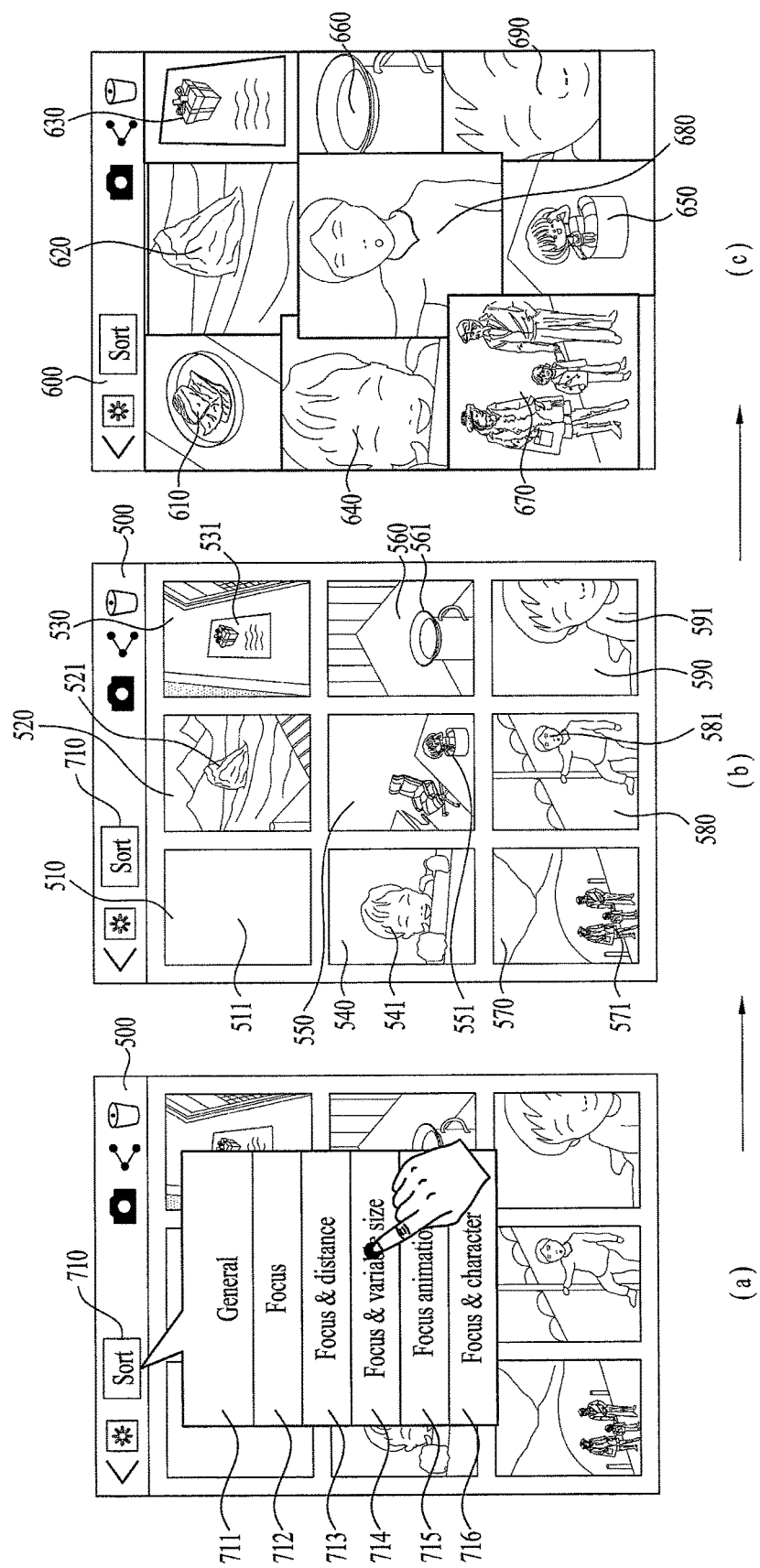

Referring to FIG. 11, if the fourth sorting option 714 is selected from the sorting option list (FIG. 11 (a)), the controller 180 creates the corresponding thumbnails 610, 620, 630, 640, 650, 660, 670, 680 and 690 centering on the focal regions 511, 521, 531, 541, 551, 561, 571, 581 and 591 focused on in the images having the focus information among a multitude of the thumbnails 510, 520, 530, 540, 540, 550, 560, 570, 580 and 590 shown in FIG. 11 (b) (FIG. 11 (c)). In particular, the controller 180 creates the thumbnails 610, 620, 630, 640, 650, 660, 670, 680 and 690 by differentiating sizes of the thumbnails 610, 620, 630, 640, 650, 660, 670, 680 and 690 in accordance with one of the sizes of the focal regions, the distances (e.g., subject distances) to the focal regions and the focal distances and then displays a second thumbnail list 600 containing the created thumbnails 610, 620, 630, 640, 650, 660, 670, 680 and 690.

In particular, based on the corresponding focus information, if a size of a focal region in an image is large or a range of the focal region is wide, since a part supposed to be displayed on a corresponding thumbnail increases, the controller 180 increases a size of a corresponding thumbnail to display. Further, if a size of a focal region in an image is small or a range of the focal region is narrow, the controller 180 decreases a size of a corresponding thumbnail to display.

Based on the corresponding focus information, if a distance to a focal region in an image from the camera 121 increases, the controller increases a size of a corresponding thumbnail to display. Further, if a distance to a focal region in an image from the camera 121 decreases, the controller decreases a size of a corresponding thumbnail to display.

Based on the corresponding focus information, if a distance to a focal region in an image from the camera 121 decreases, the controller increases a size of a corresponding thumbnail to display. Further, if a distance to a focal region in an image from the camera 121 increases, the controller decreases a size of a corresponding thumbnail to display.

Figure 12:
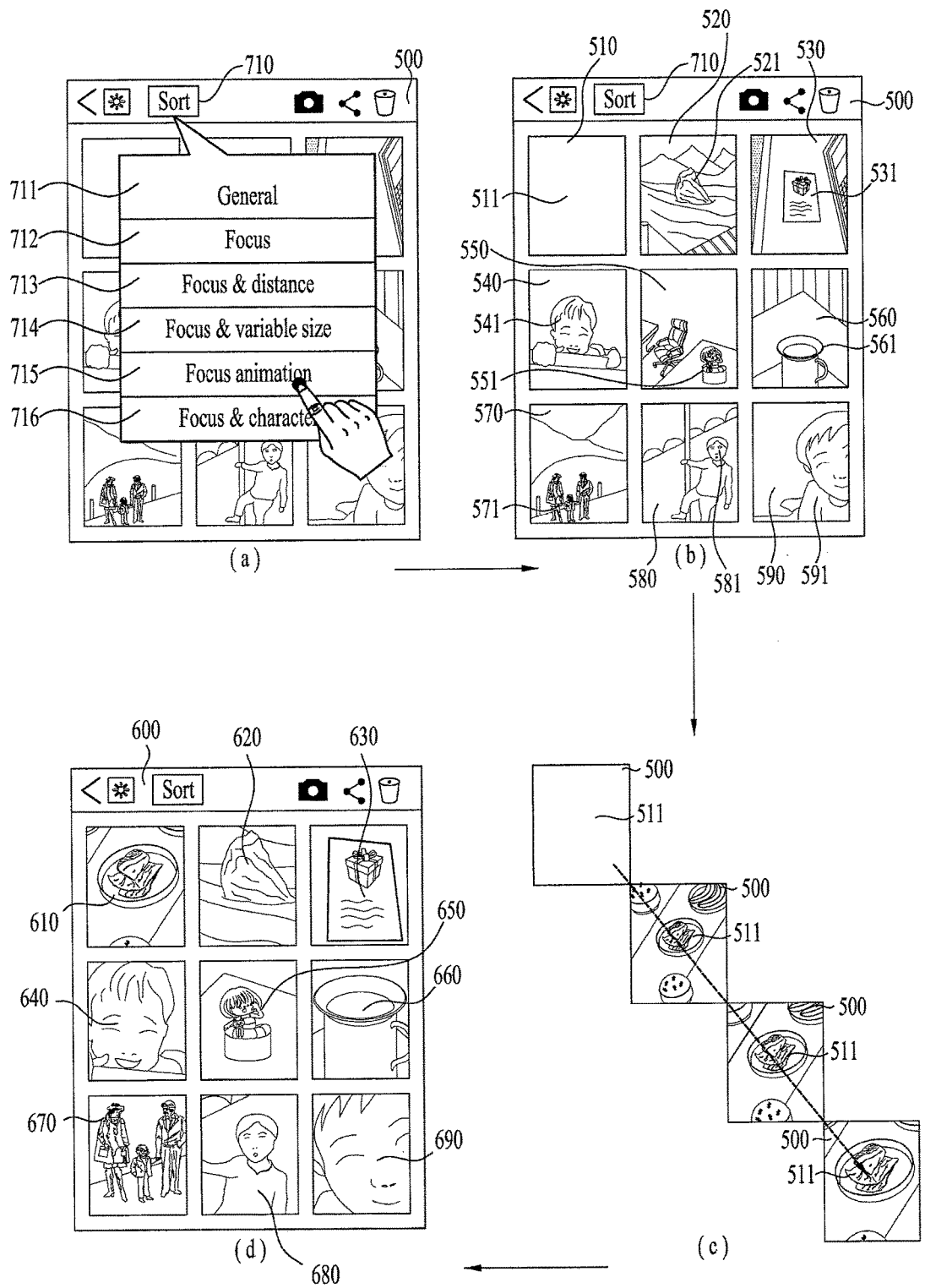

Referring to FIG. 12, if the fifth sorting option 715 is selected from the sorting option list (FIG. 12 (a)), the controller 180 creates the corresponding thumbnails 610, 620, 630, 640, 650, 660, 670, 680 and 690 centering on the focal regions 511, 521, 531, 541, 551, 561, 571, 581 and 591 focused on in the images having the focus information and then displays a second thumbnail list 600 containing the created thumbnails (FIG. 12 (b), FIG. 12 (c), FIG. 12 (d)). In particular, the controller 180 displays a visual effect in a manner that the focal regions 511, 521, 531, 541, 551, 561, 571, 581 and 591 gradually move to center positions of the corresponding thumbnails 610, 620, 630, 640, 650, 660, 670, 680 and 690 from original positions, respectively.

For instance, FIG. 12 (c) shows a visual effect working in a manner that a focal region 511 in a 1A thumbnail 510 in the first thumbnail list 500 gradually moves into a center position of a 1B thumbnail 610 in the second thumbnail list 600 from an original position.

Figure 13:
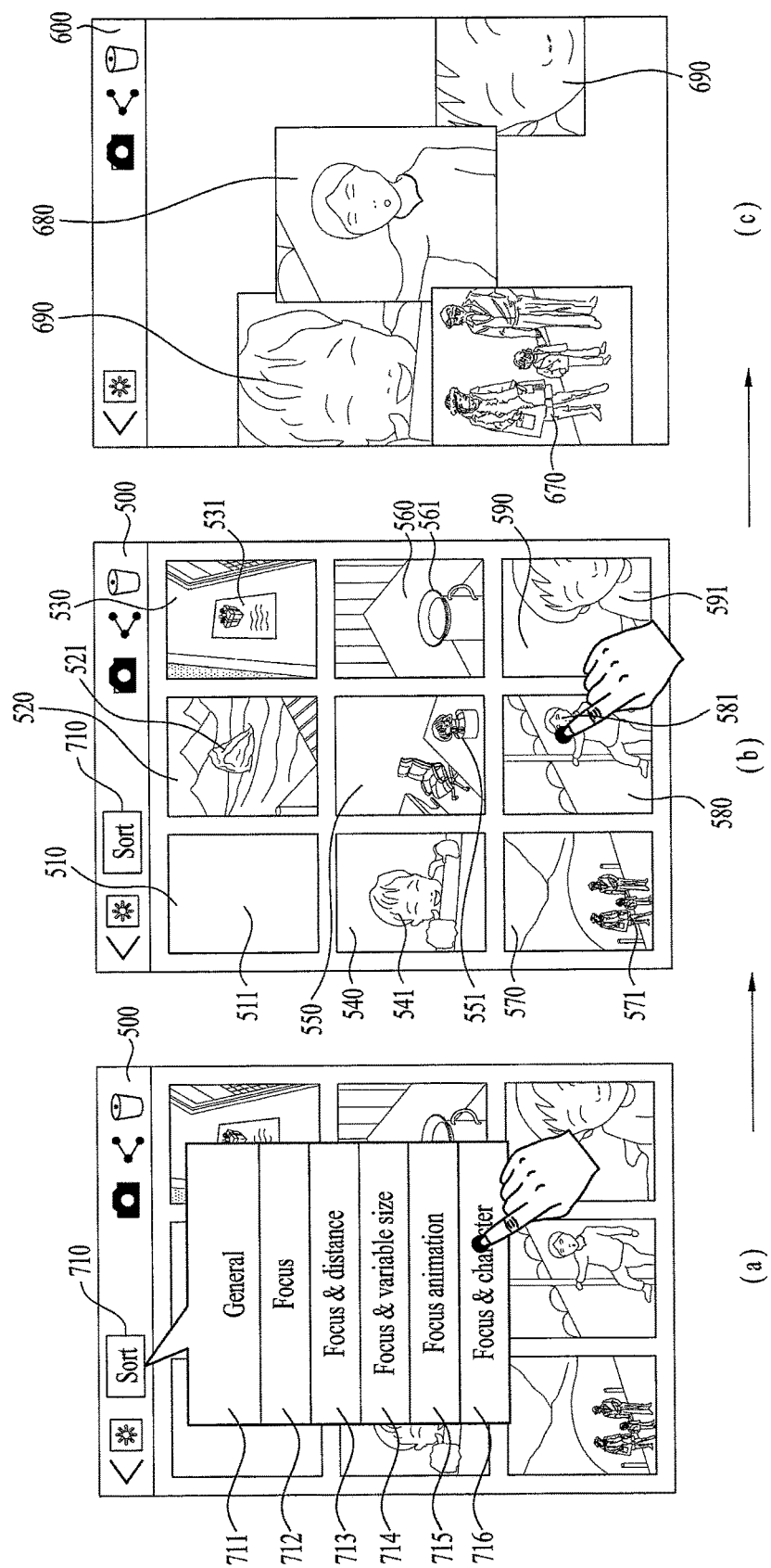

Referring to FIG. 13, if the sixth sorting option 716 is selected from the sorting option list (FIG. 13 (a)) and a specific thumbnail 580 is selected from a multitude of the thumbnails 510, 520, 530, 540, 540, 550, 560, 570, 580 and 590 shown in FIG. 13 (b), the controller 180 recognizes that a search command for searching for a different thumbnail associated with a focal region 581 in the selected thumbnail 580 has been input. Subsequently, using the focus information of the focal region 581 in the selected thumbnail 580, the controller 180 searches the memory 160 for at least one image having the focus information associated with a shape of the focal region 581.

In this instance, if the focal region 581 of the image corresponding to the selected thumbnail 580 is a character, the controller 180 recognizes a face part of the character using face recognition algorithm and then obtains focus information corresponding to the recognized face part from the focus information on the focal region in the image. In addition, the controller 180 searches the images saved in the memory 160 for images each of which has a pattern similar to the focus information corresponding to the face part or the same focus information corresponding to the face part.

If the images having the focus information associated with the shape of the focal region 581 is found, referring to FIG. 13 (c), the controller 180 creates the corresponding thumbnails 640, 670, 680 and 690 centering on the focal regions focused on in the found images based on the focus information of the found images and then displays a second thumbnail list containing the created thumbnails 640, 670, 680 and 690.

The controller 180 changes the first thumbnail list 500 into the focus-based second thumbnail list 600 and then displays the second thumbnail list 600. Subsequently, if the $6^{th}$ sorting option 716 is selected and a specific thumbnail is selected from the second thumbnail list 600, the controller 180 searches the thumbnails in the second thumbnail list 600 for at least one thumbnail having the focus information associated with the shape of the focal region using the focus information of the focal region in the selected thumbnail.

In this instance, if the focal region of the image corresponding to the selected thumbnail is a character, the controller 180 recognizes a face part of the character, obtains focus information corresponding to the recognized face part from the focus information on the focal region in the image, searches the images respectively corresponding to the thumbnails contained in the second thumbnail list 600 for images each of which has a pattern similar to the focus information corresponding to the face part or the same focus information corresponding to the face part, and may be then able to display the thumbnails corresponding to the found images nearby the selected specific thumbnail.

FIGS. 14 to 17 show a process as follows. First of all, if a specific thumbnail is selected from the focus-based second thumbnail list 600, the controller 180 displays an image viewer screen for displaying a whole image corresponding to the selected thumbnail. Secondly, the controller 180 controls a focal region focused on in the image viewer screen to be displayed identifiably.

Referring to FIG. 14, if a specific thumbnail 650 displayed centering on a focal region is selected from a focus-based second thumbnail list 600 according to an embodiment of the present invention (FIG. 14 (a)), the controller 180 displays an image viewer screen that displays a full original copy of an image 810 corresponding to the selected thumbnail 650 (FIG. 14 (b)). In particular, the controller 180 can control a focal region 811 in the image 810 to be identifiably displayed within the image viewer screen.

For instance, referring to FIG. 14 (b), the controller 180 can control the focal region 811 to be identifiably displayed within the image viewer screen by being represented with a highlight 720 in specific color. In another instance, the controller 180 can control the focal region 811 to be identifiably displayed within the image viewer screen in a manner that a specific line is displayed on an outline of the focal region 811. For further instance, the controller 180 can control the focal region 811 to be identifiably displayed within the image viewer screen by being projected from the screen. For another further instance, the controller 180 can control the focal region 811 to be identifiably displayed within the image viewer screen by being displayed 3-dimensionally in the image only.

Based on the focus information of the focal region 811, the controller 180 obtains parts differing in depth within the focal region 811 and can control the depth-differing parts to be identifiably displayed. For instance, the controller 180 can control the depth-differing parts to be identifiably displayed by being highlighted in different color.

Referring to FIG. 15, if a specific thumbnail 650 displayed centering on a focal region is selected from a focus-based second thumbnail list 600 according to an embodiment of the present invention (FIG. 15 (a)), the controller 180 displays an image viewer screen that displays a focal region 811 of an image 810 corresponding to the selected thumbnail 650 only so that the focal region 811 of the image 810 can be identifiably displayed within the image viewer screen (FIG. 15 (b)).

Referring to FIG. 16, if a specific thumbnail 650 displayed centering on a focal region is selected from a focus-based second thumbnail list 600 according to an embodiment of the present invention (FIG. 16 (a)), the controller 180 controls an image 810 corresponding to the selected thumbnail 650 to be displayed by being edge-transformed and then displays a box in specific color on a part corresponding to a focal region 811 of the edge-transformed image 810, whereby the focal region 811 of the image 810 can be identifiably displayed (FIG. 16 (b)).

The controller can control the focal region 811 of the image 810 to be identifiably displayed in a manner that the rest of the image except the focal region 811 is displayed by being edge-transformed. In particular, the controller 180 extracts the focal region 811 from the image 810, controls the image 810 to be displayed by being edge-transformed, and then synthesizes a part corresponding to the focal region 811 of the edge-transformed image 810 with the extracted focal region 811, whereby the focal region 811 of the image 810 can be identifiably displayed.

The controller can control the focal region 811 of the image 810 to be identifiably displayed by being edge-transformed only within the image 810. In particular, the controller 180 extracts the focal region 811 from the image 810, controls the extracted focal region 811 to be edge-transformed, and then synthesizes a part corresponding to the focal region 811 of the image 810 with the edge-transformed focal region 811, whereby the focal region 811 of the image 810 can be identifiably displayed.

Figure 17:
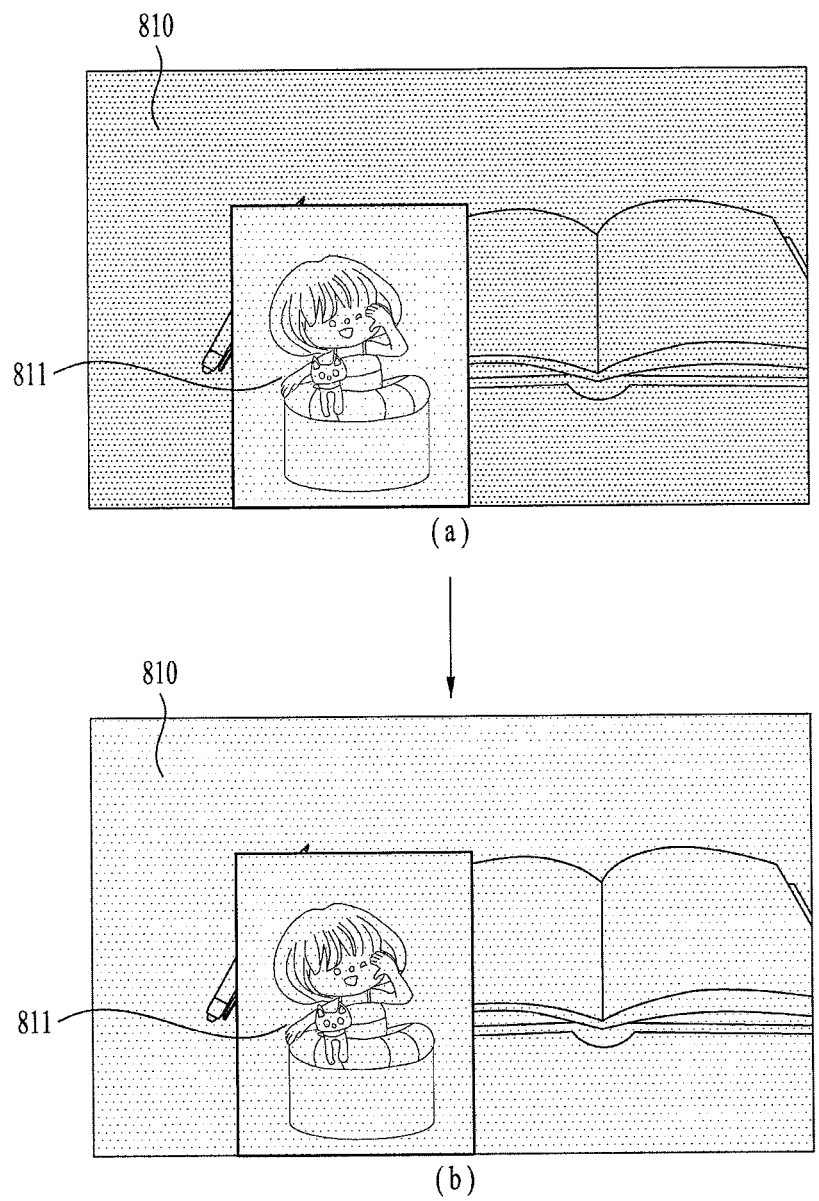

Referring to FIG. 17, if a specific thumbnail 650 displayed centering on a focal region is selected from a focus-based second thumbnail list 600 according to an embodiment of the present invention (FIG. 17 (a)), the controller 180 displays an image viewer screen that displays a full original copy of an image 810 corresponding to the selected thumbnail 650 and can then change a brightness of an unfocused region in the image 810 into the same brightness of the focal region 811. When the controller 180 displays a specific thumbnail 650 on the second thumbnail list 600, the controller 180 can change a brightness of an unfocused region in the thumbnail 650 into the same brightness of the focal region 811.

Figure 18:
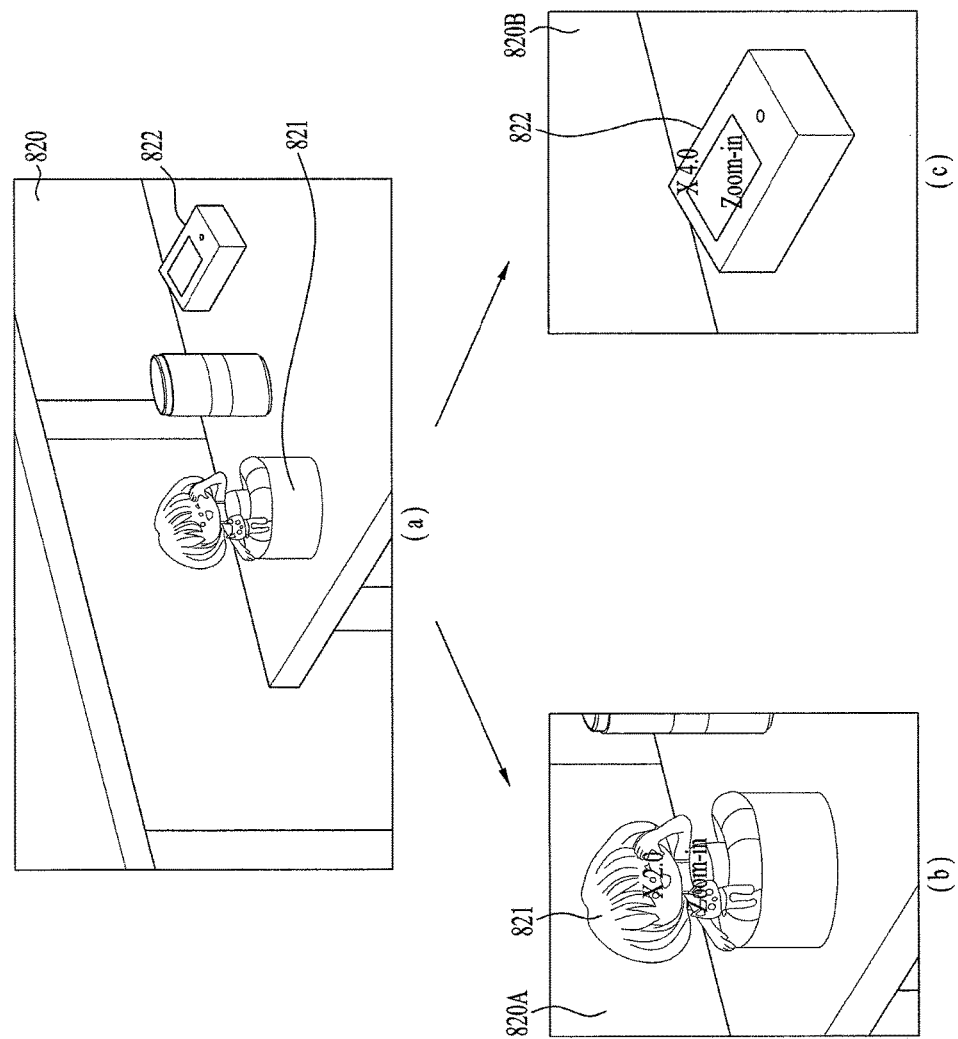
Figure 19:
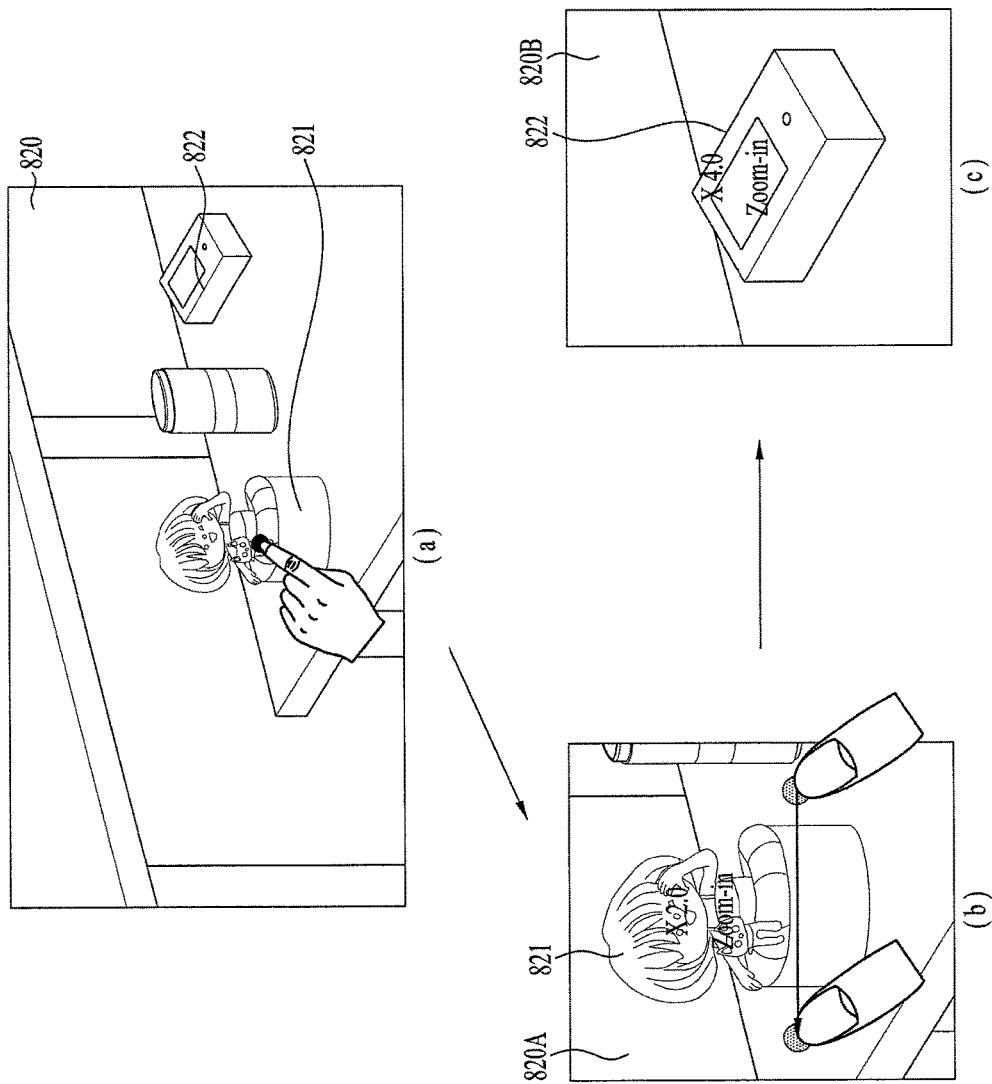

FIGS. 18 to 20 show a following process. First of all, if at least two focal regions exist in an image viewer screen, a different magnification rate is applied to each of the focal regions based on focus information of the focal regions. Referring to FIG. 18 (a), a specific thumbnail 650 displayed centering on a focal region is selected from a focus-based second thumbnail list 600 according to an embodiment of the present invention and an image viewer screen, which displays a full original copy of an image 810 corresponding to the selected thumbnail 650, is displayed.

Thus, if a double-tap touch is input by touching an enlargement desired point in the image viewer screen consecutively twice, the screen is enlarged with a preset magnification rate centering on the double-tap touch input point. Thus, according to an embodiment of the present invention, when at least two focal regions including a first focal region 821 and a second focal region 822, each of which has focus information, exist in the image viewer screen, if a double-tap touch input point for the enlargement in the image viewer screen includes the first focal point 821 and the second focal region 822, different magnification rates can be applied to the first focal region 821 and the second focal region 822 depending on a distance difference between the first focal region 821 and the second focal region 822 based on the focal information of the first focal region 821 and the second focal region 822.

For instance, based on the corresponding focus information, when a distance of the first focal region 821 from the camera 121 is 20 cm and a distance of the second focal region 822 from the camera 121 is 40 cm, if the double-tap touch is input to the first focal region 821 shown in FIG. 18 (a), referring to FIG. 18 (b), the controller 180 can display a first image 820A enlarged by ×2.0 centering on the first focal region 821.

Moreover, if the double-tap touch is input to the second focal region 822 shown in FIG. 18 (a), referring to FIG. 18 (c), the controller 180 can display a second image 820B enlarged by ×4.0 centering on the second focal region 822. In particular, if a distance of each of the focal regions 821 and 822 to be enlarged in the image increases, the controller 180 increases a magnification rate of the corresponding focal region. If a distance of each of the focal regions 821 and 822 to be enlarged in the image decreases, the controller 180 decreases a magnification rate of the corresponding focal region.

Meanwhile, if a double-tap touch input point for the enlargement in the image viewer screen does not include any of the first focal point 821 and the second focal region 822, the controller 180 controls the double-tap input point to be displayed by being enlarged by a preset magnification rate.

Referring to FIG. 19, if a touch gesture for enlargement of a first focal region 821 is input onto an image viewer screen including the first focal point 821 and the second focal region 822 (FIG. 19 (a)), based on focus information of the first focal region 821, the controller 180 displays a first image 820A enlarged centering on the first focal region 821 depending on a distance of the first focal region 821 from the camera 121 (FIG. 19 (b)).

If a display region of the enlarged first image 820A is shifted to a display region including the second focal region 822 from a display region including the first focal region 821 by a user's drag touch gesture (FIG. 19 (b)), based on focus information of the second focal region 822, the controller 180 displays a second image 820B enlarged centering on the second focal region 822 depending on a distance of the second focal region 822 from the camera 121 (FIG. 19 (c)).

For instance, referring to FIG. 19 (c), the second focal region 822 is located farther than the first focal region 821. Hence, the second focal region 822 is further enlarged than the first focal region 821.

FIG. 20 shows a following process. First of all, if a thumbnail indicating a moving image created by being photographed through the camera 121 is selected from a focus-based second thumbnail list according to an embodiment of the present invention, the controller 180 plays the moving image 830. Secondly, if a focal region having focus information exists in a currently played scene of the currently played moving image, a different magnification rate is applied to the focal region based on the focus information.

For instance, referring to FIG. 20 (*a*), while a first scene of the moving image 830 is played, if a first focal region 831 having focus information exists in the first scene, based on the focus information of the first focal region 831, the controller 180 enlarges and displays the first scene centering on the first focal region 831 depending on a distance of the first focal region 831 from the camera 121.

Thus, referring to FIG. 20 (*b*), if the enlarged first scene currently displayed is switched to a second scene including a second focal region 832, based on focus information of the second focal region 832, the controller 180 enlarges and displays the second scene centering on the second focal region 832 depending on a distance of the second focal region 832 from the camera 121.

For instance, referring to FIG. 20 (*b*), the second focal region 832 is located farther than the first focal region 831. Hence, the second focal region 832 is further enlarged than the first focal region 831.

Figure 21:
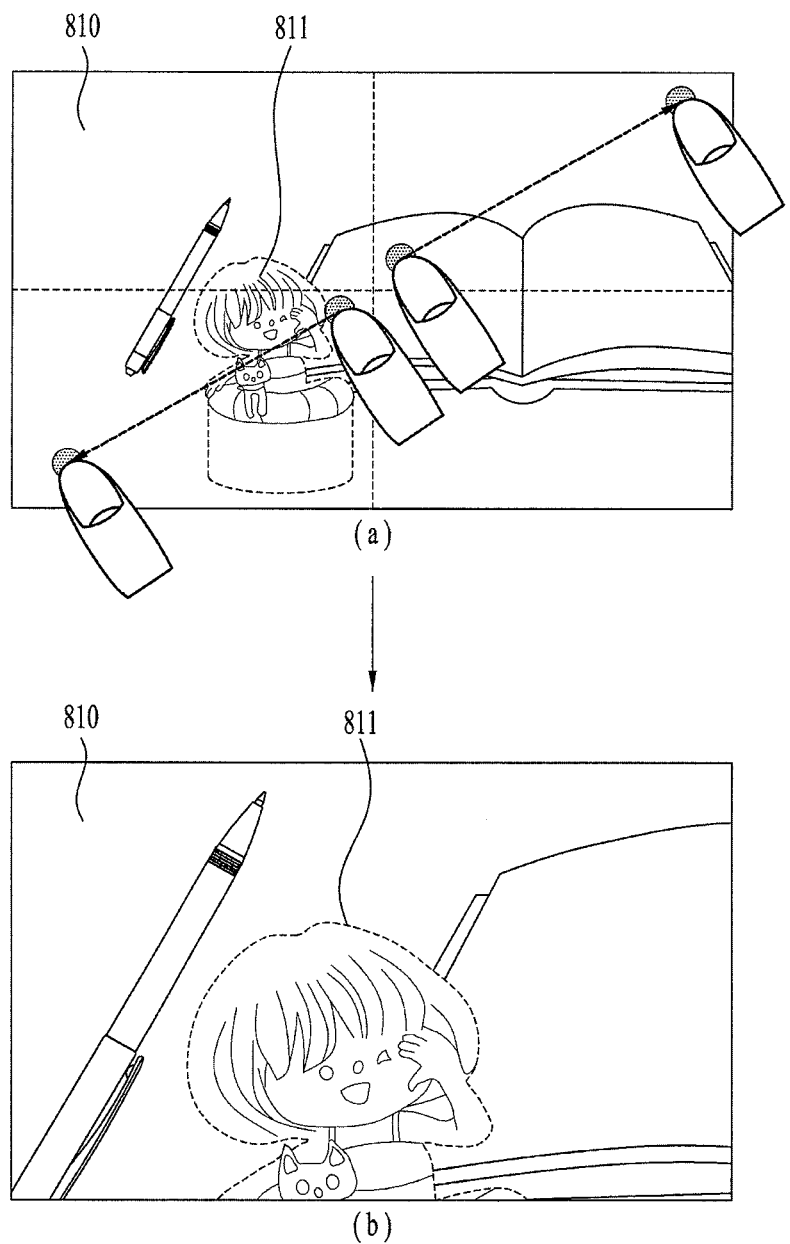

FIG. 21 shows a following process. First of all, when a focal region having focus information exists in an image viewer screen, if a touch gesture for zoom-in or zoom-out of an image is input to a specific point on the image viewer screen, the controller 180 zooms in on or out of the image centering not on the touch gesture input point but on the focal region.

In particular, referring to FIG. 21 (*a*), if a specific thumbnail displayed centering on a focal region is selected from a focus-based second thumbnail list 600 according to an embodiment of the present invention, the controller 180 displays an image viewer screen which displays a full original copy of an image 810 corresponding to the selected thumbnail.

Thus, if a pinch-out touch gesture for zooming in on the image or a pinch-in touch gesture for zooming out of the image is input to a point (e.g., a center point) different from a focal region 811 in the image viewer screen, referring to FIG. 21 (*b*), the controller 180 displays the image 810 by zooming in on or out of the image 810 centering not on the pinch-in/out touch gesture input point but on the focal region 811.

For instance, referring to FIG. 21 (*a*), the focal region 811 is located on a left side with reference to a center of the image 810. In addition, the pinch-out touch gesture for the zoom-in of the image 810 is input to a center point of the image 810. In this instance, according to a related art, the controller 180 zooms in on the image 810 centering on the pinch-out touch gesture input point irrespective of a position of the focal region 811. Yet, according to an embodiment of the present invention, referring to FIG. 21, the controller 180 zooms in on the image 810 centering on the focal region 811 in the image 810 irrespective of a position of the pinch-out touch gesture input point.

FIG. 22 shows a following process. First of all, the controller 180 displays a setting bot 730 for setting a position and size of a part to edit in an image viewer screen not on a center of the image viewer screen but on a focal region. In particular, referring to FIG. 22 (*a*), if a specific thumbnail displayed centering on a focal region is selected from a focus-based second thumbnail list 600 according to an embodiment of the present invention, the controller 180 displays an image viewer screen which displays a full original copy of an image 810 corresponding to the selected thumbnail Thus, referring to FIG. 22 (*b*), if an editing function of the image 810 is selected, the controller 180 displays a setting bot 730 for setting a position and size of a part to edit in the image viewer screen not on a center of the image viewer screen but on the focal region 811. In this instance, the editing function includes a crop function of cropping a partial image within the setting box 730 from the image 810. If a size of the setting box 730 is unable to cover the whole focal region 811, the controller 180 can automatically change the size into a size enough to cover the whole focal region 811.

Figure 24:
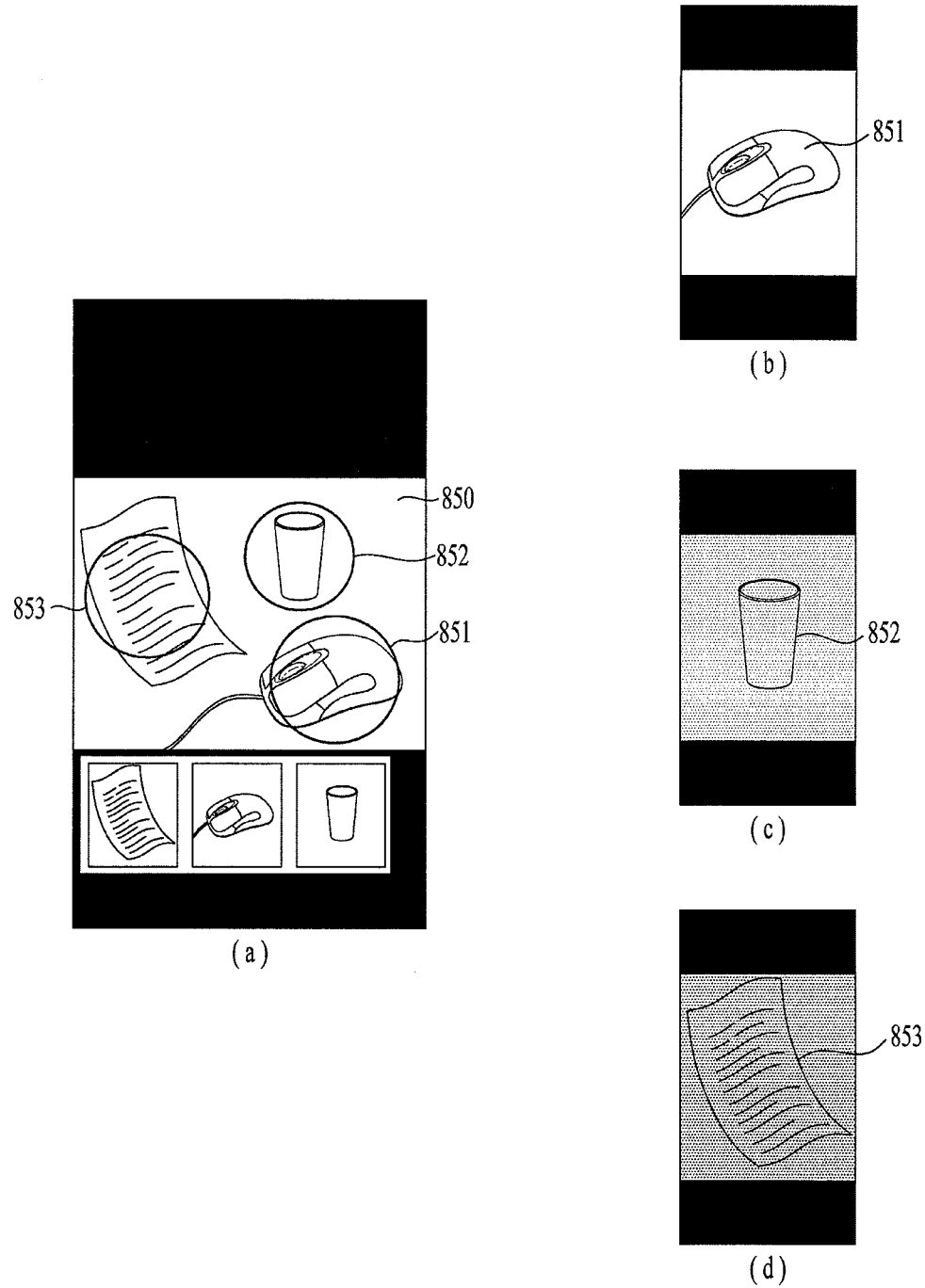

FIG. 23 and FIG. 24 show processes for the controller 180 to selectively edit at least one focal region within an image viewer screen only, respectively. First of all, FIG. 23 shows a process for the controller 180 to selectively edit a single focal region within an image viewer screen only.

Referring to FIG. 23 (*a*), if a specific thumbnail displayed centering on a focal region is selected from a focus-based second thumbnail list 600 according to an embodiment of the present invention, the controller 180 displays an image viewer screen which displays a full original copy of an image 840 corresponding to the selected thumbnail.

Thus, referring to FIG. 23 (*b*), if a specific editing function is selected, the controller 180 applies an editing effect corresponding to the selected editing function to the focal region 841 within the image viewer screen only. For instance, the editing function may include at least one of a rotation of the focal region 841, a change of at least one a resolution, chroma and brightness of the focal region 841, a color change of the focal region 841, and the like.

In particular, according to a related art, it is difficult to give an editing effect selected by a user to a specific region in an image only. In addition, in order to give the editing effect to the specific region only, the specific region should be designated in the image one by one. Yet, according to an embodiment of the present invention, it can give a user-selected editing effect to a focal region focused on by a user who regards the focal region as important.

FIG. 24 shows a process for the controller 180 to selectively edit at least two focal regions within an image viewer screen only. Referring to FIG. 24 (*a*), if a specific thumbnail displayed centering on a focal region is selected from a focus-based second thumbnail list 600 according to an embodiment of the present invention, the controller 180 displays an image viewer screen which displays a full original copy of an image 850 corresponding to the selected thumbnail. Thus, if at least two focal regions including first to third focal regions 851, 852 and 853 exist in the image 850, the controller 180 can display thumbnails centering on the first to third focal regions 851, 852 and 853 on the image viewer screen.

Referring to FIGS. 24 (*b*) to 24 (*d*), if a specific editing function is selected by a user, based on focus information of the first to third focal regions 851, 852 and 853, the controller 180 can give a different editing effect of the selected editing function to each of the first to third focal regions 851, 852 and 853 depending on at least one of a distance from the camera 121 to the corresponding focal region, a depth of the corresponding focal region, and a focal distance of the corresponding focal region.

In particular, if the at least one of the distance from the camera 121 to the corresponding focal region, the depth of the corresponding focal region, and the focal distance of the corresponding focal region increases, the controller 180 can give an increasing or decreasing editing effect of the selected editing function.

For instance, when the editing function is a brightness change function, if a distance from the camera 121 to the first focal region 851 is 20 cm, a distance from the camera 121 to the second focal region 852 is 30 cm, and a distance from the camera 121 to the third focal region 853 is 40 cm, the controller 180 changes the brightness of the first focal region 851 into a first level (FIG. 24 (*b*)), changes the brightness of the second focal region 852 into a second level (>first level) (FIG. 24 (*c*)), and changes the brightness of the third focal region 853 into a third level (>second level) (FIG. 24 (*d*)).

Moreover, if a specific editing function is selected by a user, the controller 180 can give the same editing effect of the selected editing function to the first to third focal regions 851, 852 and 853 collectively.

Figure 25:
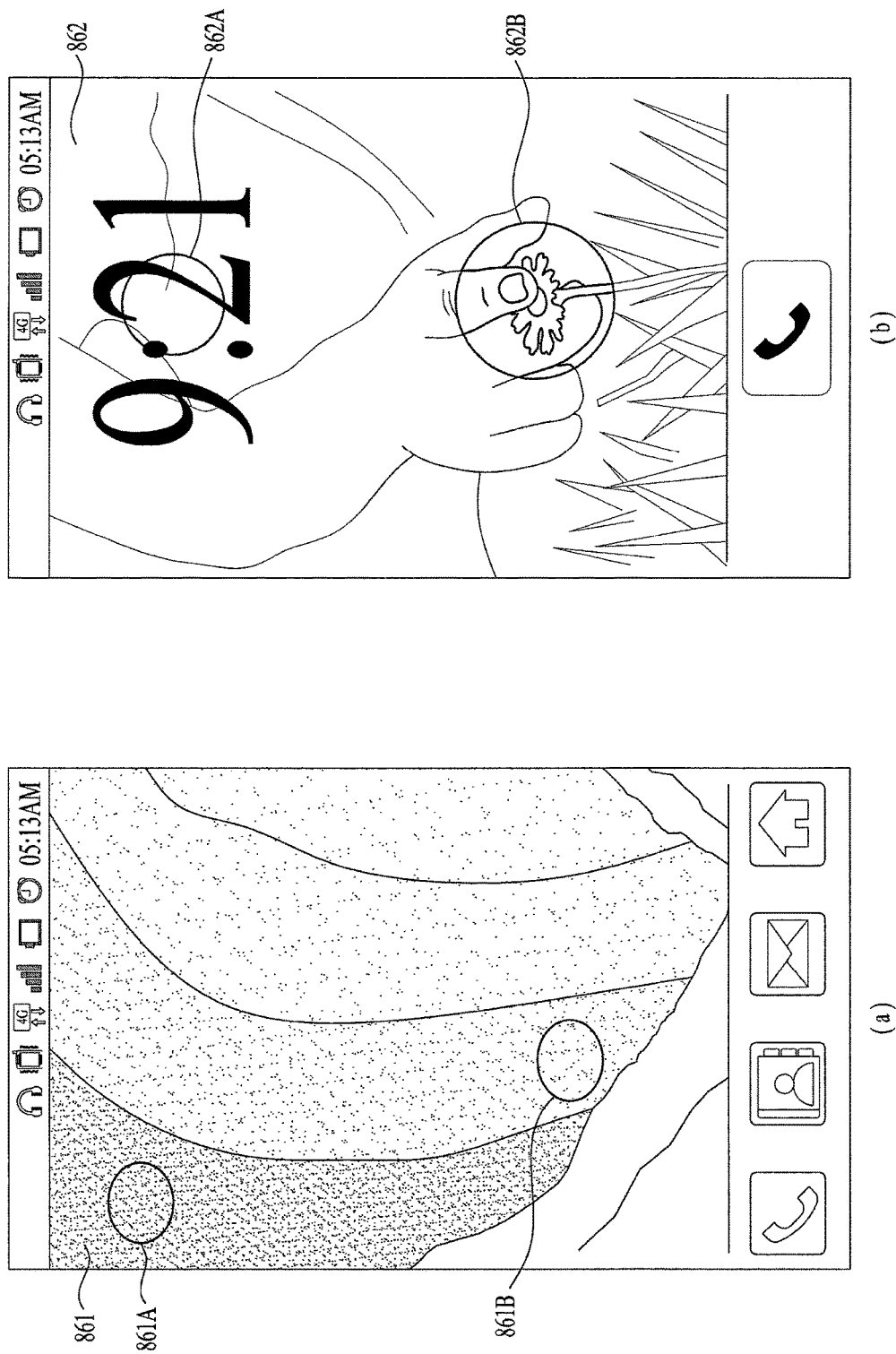
Figure 27:
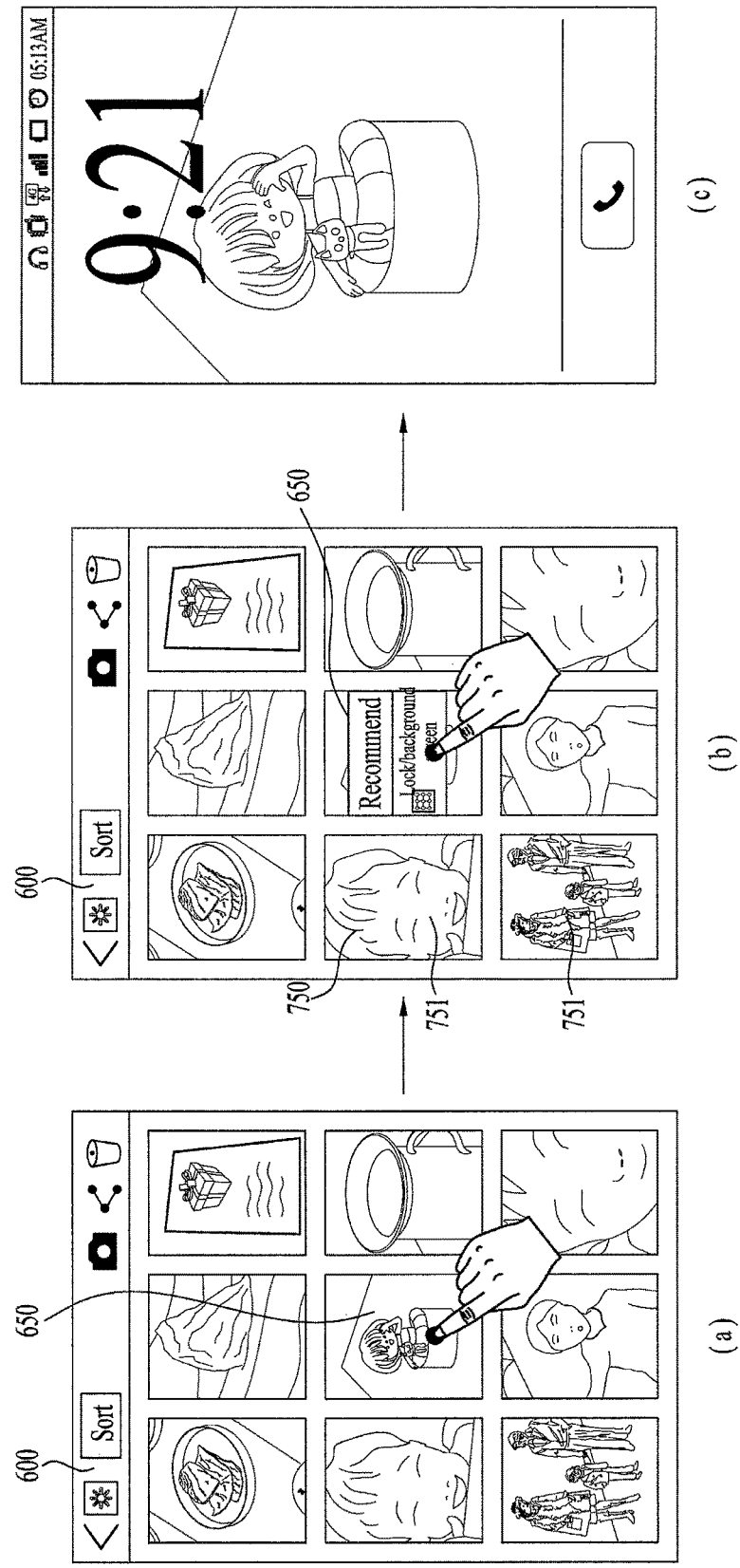

FIGS. 25 to 27 show processes for the controller 180 to set focus information based image of the present invention as a background screen image or a lock screen image of the mobile terminal, respectively. Referring to FIG. 25 (*a*), a first image 861 includes 1-1 focal region 861A and 1-2 focal region 861B. In addition, focus information of a whole region of the first image 861 is almost same by including focus information of the 1-1 and 1-2 focal regions 861A and 861B.

Referring to FIG. 25 (*b*), a second image 862 includes 2-1 focal region 862A and 2-2 focal region 862B. Focal information of regions around the 2-1 focal region 862A are different from each other centering on the 2-2 focal region 862B of a finger part. In particular, an image used as a background screen of the mobile terminal 100 has the almost same or similar focus information on a whole display region. yet, an image used as a lock screen of the mobile terminal 100 generally uses an image focused on a specific display region by having out-focused surroundings.

Hence, when a focus-based second thumbnail list is displayed, the controller 180 can control thumbnails included in the second thumbnail list to be displayed by being sorted into the thumbnails of the background image and the thumbnail of the lock screen image.

In particular, referring to FIG. 26 (*a*), thumbnails of images having focal information in a focal-based second thumbnail list of the present invention are represented as a single integrated item 740.

Referring to FIG. 26 (*b*), the controller 180 creates and displays a first item 741 created from integrating thumbnails of all-in-focused images suitable for the background screen among images indicating the thumbnails included in the second thumbnail list into one and a second item 742 created from integrating thumbnails of out-of-focused images suitable for the lock screen among the images indicating the thumbnails included in the second thumbnail list into one.

If the first item 741 is selected, the controller 180 displays a first list of the thumbnails of the all-in-focused images belonging to the first item 741. If a specific thumbnail is selected from the first list, the controller 180 sets the image corresponding to the selected thumbnail as a background screen of the mobile terminal 100.

If the second item 742 is selected, the controller 180 displays a second list of the thumbnails of the out-of-focused images belonging to the second item 742. If a specific thumbnail is selected from the second list, the controller 180 sets the image corresponding to the selected thumbnail as a lock screen of the mobile terminal 100.

Referring to FIG. 27 (*a*), a focus-based second thumbnail list of the present invention is displayed.

Thus, if a specific thumbnail 650 is selected from the second thumbnail list 600, based on focus information of an image corresponding to the selected thumbnail 650, the controller 180 obtains whether the image corresponding to the selected thumbnail 650 is an all-in-focused image suitable for the background image or an out-of-focused image suitable for the lock screen.

Once the controller 180 obtains whether the image corresponding to the selected thumbnail 650 is the all-in-focused image suitable for the background image or the out-of-focused image suitable for the lock screen, referring to FIG. 27 (*b*), the controller 180 displays an information for recommending the image corresponding to the selected thumbnail 650 as the background screen image or the lock screen image. If the displayed information is selected, referring to FIG. 27 (*c*), the controller 180 sets the image corresponding to the selected thumbnail 650 as the background screen image or the lock screen image in accordance with the selected information.

For instance, referring to FIG. 27, the image corresponding to the selected thumbnail 650 is the out-of-focused image suitable for the lock screen. In addition, the controller 180 displays the lock screen image set to the image corresponding to the selected thumbnail 650.

FIG. 28 and FIG. 29 show a following process. First of all, if a specific thumbnail is selected from the focus-based second thumbnail list 600, the controller 180 displays an image viewer screen that displays a whole image corresponding to the selected thumbnail. If there is an audio file linked to the image to be simultaneously output on displaying the image, an audio zoom of the currently output audio file is performed centering on a focal region included in the image.

FIG. 28 (*a*) shows a process for selecting a region on which an audio zoom will be performed from an image 820 according to a related art. According to the related art, the image 820 is partitioned into a multitude of regions 823A, 823B and 823C. if a specific region is selected from the regions 823A, 823B and 823C, an audio zoom is performed centering on the specific region on outputting an audio file linked to the image.

Further, referring to FIG. 28 (*b*), if a specific focal region 821 is selected from the image viewer screen, the controller 180 performs an audio zoom centering on the focal region 821 on outputting the audio file linked to the image.

Moreover, when a single focal region exists in the image viewer screen only, the controller 180 can automatically perform an audio zoom centering on the focal region on outputting the audio file linked to the image without selecting the focal region.

Referring to FIG. 29 (*a*), if at least two focal regions including a first focal region 821 and a second focal region 822 exist in the image, the controller 180 displays thumbnails 821A and 822A respectively centering on the first focal region 821 and the second focal region 822 on the image viewer screen. If one of the thumbnails 821A and 822A is selected, the controller 180 performs an audio zoom centering on the focal region 821 included in the selected thumbnail 821A on outputting an audio file linked to the image 820.

Referring to FIG. 29 (*b*), if at least two focal regions including a first focal region 821 and a second focal region 822 exist in the image, the controller 180 displays thumbnails 821A and 822A respectively centering on the first focal region 821 and the second focal region 822 on the image viewer screen. If one of the thumbnails 821A and 822A is touched and then dragged & dropped onto an item 760 for performing an audio zoom, the controller 180 performs the audio zoom centering on the focal region 821 included in the selected thumbnail 821A on outputting an audio file linked to the image 820.

FIG. 30 shows a following process. First of all, the controller 180 obtains images having similar focus information from a multitude of images. The controller 180 displays thumbnails respectively indicating the obtained images identifiably. The controller 180 applies an editing effect set up by a user to the obtained images collectively. The controller 180 creates the obtained images into a single file. In addition, the controller 180 saves the created file.

Referring to FIG. 30 (a), a thumbnail list 871 including focus-based thumbnails in an image viewer screen 870 is displayed. In this instance, the thumbnails may indicate scenes in a video, respectively.

In particular, referring to FIG. 30 (b), the controller 180 obtains images having similar focus information from images corresponding to the thumbnails and then groups the thumbnails respectively corresponding to the obtained images into prescribed groups 872 and 873. Thus, the controller 180 can control the groups 872 and 873 to be identifiably displayed.

If a prescribed one of the groups 872 and 873 is selected and a specific editing function is selected by a user, the controller 180 can collectively apply the selected editing function to the images corresponding to the thumbnails belonging to the selected group. For instance, the editing function may include at least one of transit, delete, copy, save and crop.

For instance, if a prescribed one of the groups 872 and 873 is selected and a save function is selected as the editing function by a user, the controller 180 creates the images corresponding to the thumbnails belonging to the selected group into a single file and then saves the file in the memory 160.

FIG. 31 (a) shows a play screen of a currently played video. In this instance, the video includes at least two scene images having focus information. If an item 770 for a focus-based seek function is selected from the play screen of the video, referring to FIG. 31 (b), the controller 180 obtains at least one or more scene images respectively having focus information similar to that of a scene image 880 of a currently played video from the scene images of the video and then controls thumbnails 881, 882 and 883 indicating the obtained scene images to be displayed at corresponding play points on a progressive bar indicating a play progressive status of the video, respectively.

If a specific one of the thumbnails 881, 882 and 883 is selected, the controller 180 shifts a current play point of the video to a play point corresponding to the selected thumbnail and the plays the video.

Referring to FIG. 32 (a), when 1-1 image 890A is attached into a specific function window 780 of a related art, the whole 1-1 image 890A is attached into the function window 780. Further, referring to FIG. 32 (b), when a focal region exists in 1-1 image 890A to be attached into a function window 780, if the 1-1 image 890A has focus information on the focal region, the controller 180 creates 1-2 image 890B from resizing the 1-1 image centering on the focal region and can then attach the created 1-2 image 890B into the function window 780.

In this instance, the function window 780 can include any kind of function window capable to attachment of data files. For instance, the function window 780 may include at least one of a message composing window, a memo window, a document window, an email composing window and the like.

Referring to FIG. 33 (a), when a focal region exists in 2-1 image to be attached into a function window 780, if the 2-1 image has focus information on the focal region, the controller 180 creates 2-2 image 890C from cropping a part corresponding to the focal region from the 2-1 image and can then attach the created 2-2 image 890C into the function window 780.

Referring to FIG. 33 (b), when a focal region exists in 3-1 image to be attached into a function window 780, if the 3-1 image has focus information on the focal region, the controller 180 creates 3-2 image 890D from cropping a part including the focal region into a preset shape (e.g., ♡ ) from the 3-1 image and can then attach the created 3-2 image 890D into the function window 780.

Accordingly, embodiments of the present invention provide several advantages.

According to at least one of embodiments of the present invention, when a thumbnail list for saved images is provided, a user can be provided with the thumbnail list for the images well photographed owing to good focusing.

According to at least one of embodiments of the present invention, the present invention displays a thumbnail created centering on a focal region focused on in an image, thereby enabling a user to recognize the corresponding image through the thumbnail more quickly and accurately.

According to at least one of embodiments of the present invention, as a thumbnail is selected, when a viewer screen of a corresponding image is displayed, the present invention provides a user with various editing functions of the image based on focus information of the image.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
    a wireless communication unit configured to perform wireless communication;
    a display unit;
    a memory configured to store a plurality of images; and
    a controller configured to:
    receive a command for displaying a focus-based thumbnail list, and
    display the focus-based thumbnail list to include at least one thumbnail corresponding to an image stored in the memory with focus information, said focus information indicating a focal region focused in the image,
    wherein the controller is further configured to:
    when the at least one thumbnail is selected, display a whole image corresponding to the at least one thumbnail, and
    change a brightness of an out-of-focused region in the displayed image into a same brightness of the focal region.

2. The mobile terminal of claim 1, wherein the controller is further configured to display the at least one thumbnail centering on the focal region within the image based on the focus information.

3. The mobile terminal of claim 1, wherein the focus information includes at least one of a position of the focal region, a size of the focal region, a focal distance, a depth or a distance to the focal region.

4. The mobile terminal of claim 1, wherein the controller is further configured to display the at least one thumbnail so the focal region is displayed at a center of the at least one thumbnail.

5. The mobile terminal of claim 1, wherein the controller is further configured to apply a different zoom magnification of the focal region displayed within the at least one thumbnail in accordance with one of a distance to the focal region and a focal distance.

6. The mobile terminal of claim 1, wherein the controller is further configured to change a size of the at least one thumbnail in the focus-based thumbnail list in accordance with a size of the focal region.

7. The mobile terminal of claim 1, wherein the controller is further configured to change a size of the at least one thumbnail in the focus-based thumbnail list in accordance with one of a distance to the focal region and a focal distance.

8. The mobile terminal of claim 1, wherein the controller is further configured to display a visual effect in the at least one thumbnail by gradually moving the focal region away from an original position into a center of the at least one thumbnail.

9. The mobile terminal of claim 1, wherein the controller is further configured to:
    receive a search command for searching for a different thumbnail associated with the focal region,
    search the focus-based thumbnail list for at least one different thumbnail associated with a shape of the focal region using the focus information of the focal region, and
    display any found different thumbnail on the display unit.

10. The mobile terminal of claim 1, wherein the controller is further configured to:
    search images having similar focus information from the plurality of images, and
    identifiably display thumbnails indicating found images on the focus-based thumbnail list.

11. The mobile terminal of claim 1, wherein the controller is further configured to search images having similar focus information from the plurality of images and collectively apply a user-editing affect to found images.

12. The mobile terminal of claim 1, wherein the controller is further configured to search images having similar focus information from the plurality of images, create a single file from found images, and save the created single file in the memory.

13. The mobile terminal of claim 1, wherein the memory is further configured to store at least one video and focus information on a plurality of scenes in the video, and
    wherein the controller is further configured to display a play screen of the video on the display unit, and display a thumbnail indicating at least one second scene having the focus information similar to that of a first scene of the video currently played on the play screen of the video.

14. The mobile terminal of claim 13, wherein when the at least one thumbnail indicating the second scene is selected, the controller is further configured to play the video from the second scene corresponding to the selected thumbnail.

15. The mobile terminal of claim 1, wherein the controller is further configured to change a brightness of an out-of-focused region in the at least one thumbnail into the same brightness of the focal region.

16. The mobile terminal of claim 1, wherein when a plurality of focal regions exist in the image and distances to the plurality of focal regions are different from each other, the controller is further configured to apply a different magnification rate to each of the plurality of focal regions based on the focus information.

17. The mobile terminal of claim 1, wherein when zooming on the displayed image, the controller is further configured to zoom centering on the focal region in the image.

18. A method of controlling a mobile terminal, the method comprising:
    storing, via a memory associated with the mobile terminal, a plurality of images;
    receiving, via a controller of the mobile terminal, a command for displaying a focus-based thumbnail list;
    displaying, via a display of the mobile terminal, the focus-based thumbnail list to include at least one thumbnail corresponding to an image stored in the memory with focus information, said focus information indicating a focal region focused in the image;
    when the at least one thumbnail is selected, displaying, via the display, a whole image corresponding to the at least one thumbnail; and
    changing, via the controller, a brightness of an out-of-focused region in the displayed image into a same brightness of the focal region.

* * * * *